United States Patent
Kawamura

(10) Patent No.: US 9,200,202 B2
(45) Date of Patent: Dec. 1, 2015

(54) NEMATIC LIQUID CRYSTAL COMPOSITION AND LIQUID CRYSTAL DISPLAY DEVICE USING THE SAME

(75) Inventor: Jouji Kawamura, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/115,408

(22) PCT Filed: Aug. 16, 2012

(86) PCT No.: PCT/JP2012/070835
§ 371 (c)(1),
(2), (4) Date: Mar. 13, 2015

(87) PCT Pub. No.: WO2014/013625
PCT Pub. Date: Jan. 23, 2014

(65) Prior Publication Data
US 2015/0175885 A1    Jun. 25, 2015

(30) Foreign Application Priority Data
Jul. 18, 2012   (JP) ................. 2012-159575

(51) Int. Cl.
*C09K 19/30* (2006.01)
*C09K 19/20* (2006.01)
*C09K 19/12* (2006.01)
*C09K 19/06* (2006.01)
*C09K 19/04* (2006.01)
*C09K 19/34* (2006.01)

(52) U.S. Cl.
CPC ........... *C09K 19/3068* (2013.01); *C09K 19/062* (2013.01); *C09K 19/063* (2013.01); *C09K 19/3001* (2013.01); *C09K 19/3066* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3006* (2013.01); *C09K 2019/3016* (2013.01); *C09K 2019/3019* (2013.01); *C09K 2019/3021* (2013.01); *C09K 2019/3025* (2013.01); *C09K 2019/3078* (2013.01); *C09K 2019/3422* (2013.01)

(58) Field of Classification Search
CPC ................. C09K 2019/0466; C09K 2019/301; C09K 2019/3004; C09K 2019/3006; C09K 2019/3016; C09K 2019/3019; C09K 2019/3021; C09K 2019/3025; C09K 2019/122; C09K 2019/123; C09K 2019/124; C09K 2019/3422; C09K 19/062; C09K 19/063; C09K 19/066; C09K 19/068; C09K 19/3001; C09K 19/3068
See application file for complete search history.

(56) References Cited

U.S. PATENT DOCUMENTS

| | | |
|---|---|---|
| 2010/0188630 A1 | 7/2010 | Goebel et al. |
| 2010/0314582 A1* | 12/2010 | Wittek et al. ............ 252/299.63 |
| 2011/0140039 A1 | 6/2011 | Wu et al. |
| 2012/0015115 A1 | 1/2012 | Lin et al. |
| 2012/0044453 A1 | 2/2012 | Miyairi et al. |
| 2012/0229751 A1 | 9/2012 | Yanai et al. |

FOREIGN PATENT DOCUMENTS

| | | |
|---|---|---|
| CN | 101916012 A | 12/2010 |
| CN | 102307968 A | 1/2012 |
| CN | 103562345 A | 2/2014 |
| CN | 103687930 A | 3/2014 |
| DE | 10 2004 004 884 A1 | 9/2004 |
| JP | 2003-518154 A | 6/2003 |
| JP | 2006-328400 A | 12/2006 |
| JP | 2007-246906 A | 9/2007 |
| JP | 2007-526931 A | 9/2007 |
| JP | 2008-502754 A | 1/2008 |
| JP | 2008-037918 A | 2/2008 |

(Continued)

OTHER PUBLICATIONS

International Search Report of PCT/JP2012/070835, mailing date of Sep. 11, 2012.

*Primary Examiner* — Shean C Wu
(74) *Attorney, Agent, or Firm* — Westerman, Hattori, Daniels & Adrian, LLP

(57) ABSTRACT

There is provided a liquid crystal composition having a positive dielectric anisotropy including: a dielectrically positive component (A) containing a dielectrically positive compound represented by Formula (1), and a dielectrically neutral component (B) having a dielectric anisotropy larger than −2 and smaller than +2 and containing at least one of dielectrically neutral compounds represented by Formulae (2.1) and (2.2).

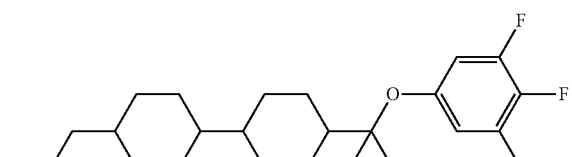

(1)

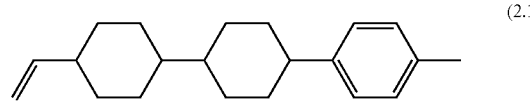

(2.1)

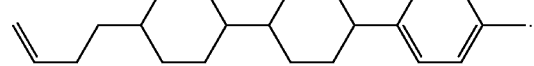

(2.2)

21 Claims, 1 Drawing Sheet

(56) References Cited

FOREIGN PATENT DOCUMENTS

| | | |
|---|---|---|
| JP | 2008-038018 A | 2/2008 |
| JP | 2008-095098 A | 4/2008 |
| JP | 2008-095110 A | 4/2008 |
| JP | 2008-156642 A | 7/2008 |
| JP | 2008-189927 A | 8/2008 |
| JP | 2008-545804 A | 12/2008 |
| JP | 2009-185285 A | 8/2009 |
| JP | 2010-501688 A | 1/2010 |
| JP | 2010-275390 A | 12/2010 |
| JP | 2010-540773 A | 12/2010 |
| JP | 2011-052120 A | 3/2011 |
| JP | 2011-516628 A | 5/2011 |
| JP | 2011-231197 A | 11/2011 |
| JP | 2012-007020 A | 1/2012 |
| JP | 2012-117062 A | 6/2012 |
| JP | 2012-219270 A | 11/2012 |
| WO | 2010/094455 A1 | 8/2010 |

* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition which is useful as a liquid crystal display material and which has a positive dielectric anisotropy (Δ∈), and the present invention also relates to a liquid crystal display device using such a nematic liquid crystal composition.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and a vertical alignment type and IPS (in-plane switching) type in which a TFT (thin film transistor) is used. Liquid crystal compositions used for such liquid crystal display devices need to satisfy the following requirements: being stable to external elements such as moisture, air, heat, and light; having a liquid crystal phase in a broad temperature range mainly including room temperature as much as possible; having a low viscosity; and enabling a low driving voltage. Liquid crystal compositions contain several to tens of compounds to adjust, for instance, dielectric anisotropy (Δ∈) and/or refractive index anisotropy (Δn) to be values optimum to individual display devices.

A liquid crystal composition having a negative Δ∈ is used in vertical alignment (VA)-type displays, and a liquid crystal composition having a positive Δ∈ is used in horizontal alignment-type displays such as a TN type, an STN type, and an IPS (in-plane switching) type. Another type of driving has been reported, in which molecules of a liquid crystal composition having a positive Δ∈ are vertically aligned in a state in which voltage is not applied, and then a horizontal electric field is applied for performing display. A demand for a liquid crystal composition having a positive Δ∈ has therefore further increased. In all types of driving, however, there have been demands for low driving voltage, quick response, and a broad range of operation temperature. In other words, a liquid crystal composition having a positive Δ∈ with a large absolute value, a low viscosity (η), and a high nematic phase-isotropic liquid phase transition temperature (Tni) has been demanded. In view of Δn×d that is a product of Δn and a cell gap (d), the Δn of a liquid crystal composition needs to be adjusted to be in a range suitable for the cell gap. In addition, quick response is important in liquid crystal display devices applied to television sets or other apparatuses, which generates a need for a liquid crystal composition having a small rotational viscosity (γ1).

Liquid crystal compositions which enable quick response have been disclosed; for example, such liquid crystal compositions contain a combination of a liquid crystal compound having a positive Δ∈ and represented by Formula (B) and liquid crystal compounds having a neutral Δ∈ and represented by Formulae (A) and (C). In these liquid crystal compositions, a liquid crystal compound having a positive Δ∈ has a structure of —CF$_2$O—, and a liquid crystal compound having a neutral Δ∈ has an alkenyl group, which is widely known in the field of these liquid crystal compositions (see Patent Literatures 1 to 4).

[Chem. 1]

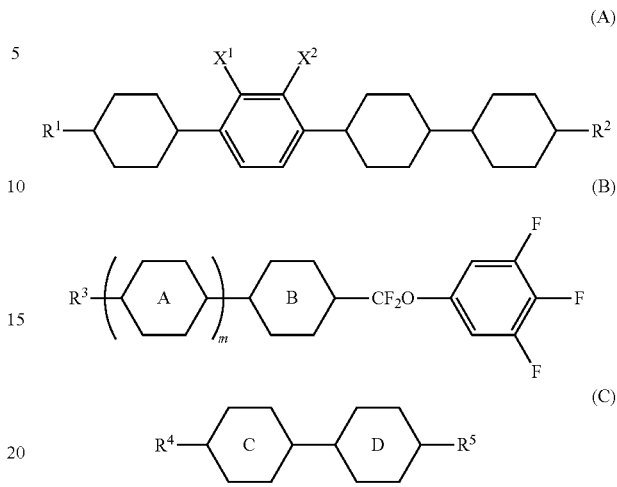

As liquid crystal display devices have come to be used in a broad range of applications, use and manufacturing thereof have been greatly changed. In order to adapt to such changes, optimization of characteristics other than known basic physical properties has been needed. In particular, a VA type and an IPS type have become popular as liquid crystal display devices utilizing a liquid crystal composition, and display devices having a very large size (e.g., 50 inches or lager) have been practically used. An increase in the size of substrates has changed a technique for putting a liquid crystal composition between substrates, and a one drop fill (ODF) technique has become mainstream in place of a typically employed vacuum injection technique; however, dropping of a liquid crystal composition onto a substrate generates stains of liquid crystal droplets with the result that display quality is degraded, which has been problematic. Furthermore, in a process for manufacturing a liquid crystal display device by an ODF technique, liquid crystal needs to be dropped in an amount optimum for the size of the liquid crystal display device. In the case where the amount of liquid crystal to be dropped largely varies from the optimum level, a predetermined balance between a refractive index and a driving electric field in a liquid crystal display device is disrupted, which causes defective display such as generation of unevenness and defective contrast. In particular, the optimum amount of liquid crystal to be placed is small in small-size liquid crystal display devices widely used in smartphones which have become popular in recent years, and thus it is difficult to even control a variation from the optimum amount to be in a certain range. Hence, in order to maintain a high yield of liquid crystal display devices, for instance, liquid crystal needs to be less affected by a rapid pressure change and impact which are generated in a dropping apparatus during dropping of the liquid crystal and to continuously enable stable dropping thereof for a long time.

In view of these circumstances, a liquid crystal composition used for active-matrix liquid crystal display devices driven by, for example, a TFT device needs to be developed without sacrificing characteristics and performance, such as quick response, needed for liquid crystal display devices while a method for manufacturing liquid crystal display devices is taken into consideration in addition to properties which have been traditionally considered important, such as exhibiting high specific resistance or a high voltage holding ratio and being stable to external elements such as light and heat.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

It is an object of the present invention to provide a liquid crystal composition which has a positive $\Delta\varepsilon$, a liquid crystal phase in a broad temperature range, a low viscosity, good resistance to resolution at low temperature, and a high specific resistance and voltage holding ratio and which is stable to heat and light; it is another object of the present invention to provide a liquid crystal display device of, for example, a TN type using the liquid crystal composition, the liquid crystal display device having a good display quality and being less likely to suffer from defective display such as screen burn-in and stains of liquid crystal droplets, use of the liquid crystal composition contributing to an increase in a yield of the liquid crystal display device.

Solution to Problem

The inventors have conducted studies on various liquid crystal compounds and various chemical substances and found that a combination of specific liquid crystal compounds enables the above-mentioned object to be achieved, thereby accomplishing the present invention.

In particular, an aspect of the present invention provides a liquid crystal composition having a positive dielectric anisotropy, the liquid crystal composition containing a dielectrically positive component (A) containing a dielectrically positive compound represented by Formula (1)

[Chem. 2]

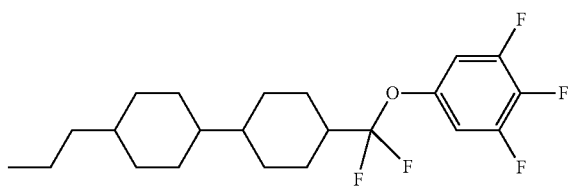

(1)

and a dielectrically neutral component (B) having a dielectric anisotropy larger than −2 and smaller than +2 and containing at least one of dielectrically neutral compounds represented by Formulae (2.1) and (2.2)

[Chem. 3]

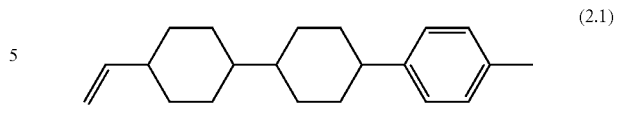

(2.1)

[Chem. 4]

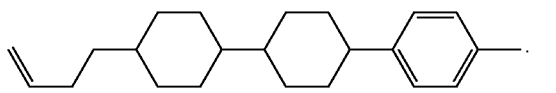

(2.2)

Furthermore, another aspect of the present invention provides a liquid crystal display device using such a liquid crystal composition.

Advantageous Effects of Invention

According to an aspect of the present invention, since the liquid crystal composition having a positive dielectric anisotropy has a greatly low viscosity, exhibits good resistance to resolution at low temperature, and has a specific resistance and voltage holding ratio which are affected by heat and light to a very small extent, products utilizing such a liquid crystal composition are highly practical, and the liquid crystal display device, such as a TN type, using the liquid crystal composition quickly responds. In addition, since the liquid crystal composition can stably work in a process for manufacturing liquid crystal display devices, the occurrence of defective display due to the manufacturing process is suppressed, so that liquid crystal display devices can be manufactured in a good yield. Thus, the liquid crystal composition is highly useful.

DESCRIPTION OF EMBODIMENTS

Figure 1:
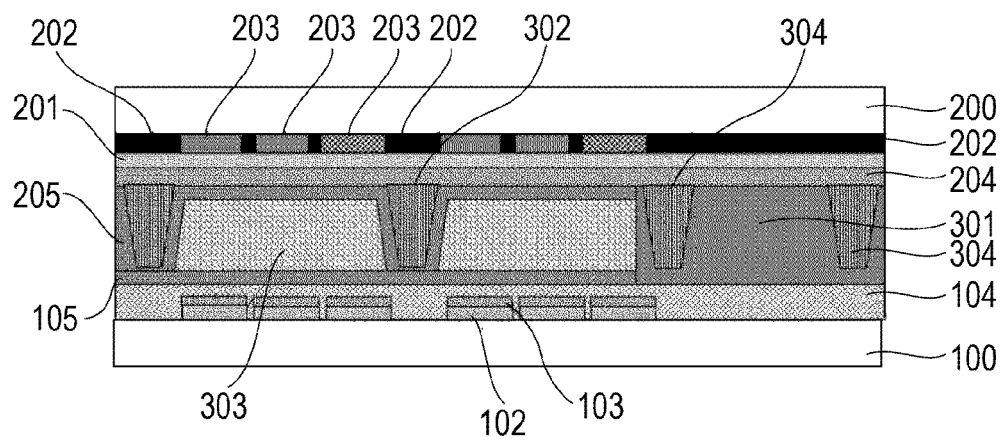
FIG. 1 is a cross-sectional view illustrating a liquid crystal display device of the present invention; a substrate including components 100 to 105 is referred to as a "backplane", and a substrate including components 200 to 205 is referred to as a "frontplane".
Figure 2:
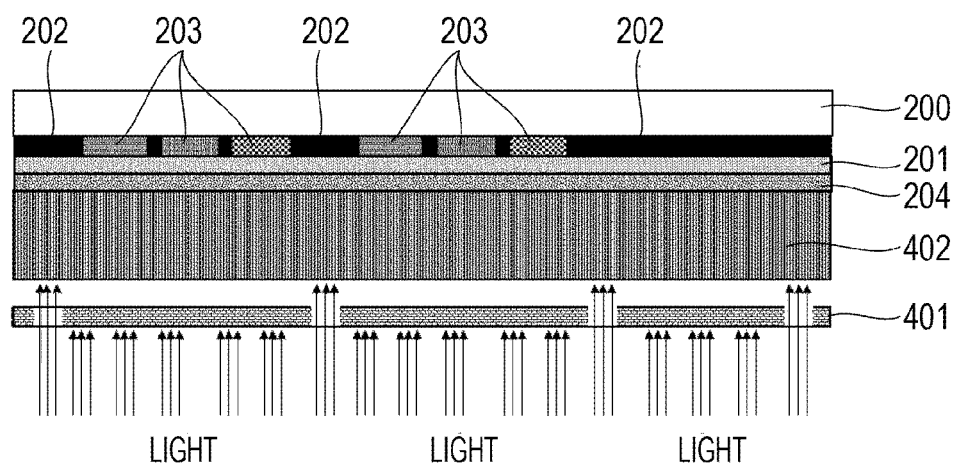
FIG. 2 illustrates an exposure process using a photomask pattern that is a pattern used for forming columnar spacers which are to be formed above a black matrix.

The liquid crystal composition of the present invention has a positive dielectric anisotropy and contains a dielectrically positive component (A). The component (A) contains a compound represented by Formula (1).

[Chem. 5]

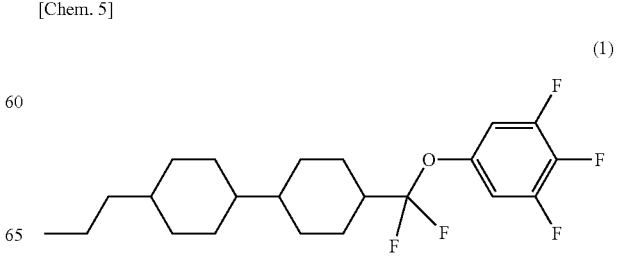

(1)

In the liquid crystal composition of the present invention, the amount of the compound contained in the component (A) and represented by Formula (1) is preferably not less than 2 mass %, more preferably 5 mass %, even more preferably not less than 9 mass %, further preferably not less than 15 mass %, and especially preferably not less than 25 mass % relative to the total amount of the liquid crystal composition of the present invention.

In the liquid crystal composition of the present invention, the dielectrically positive component (A) may contain a compound selected from the group consisting of compounds represented by Formulae (4.1) and (4.2).

[Chem. 6]

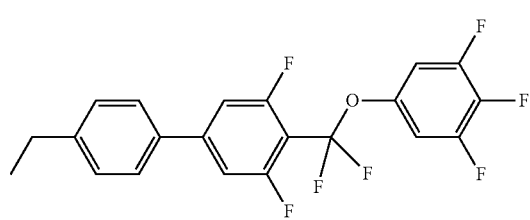

(4.1)

[Chem. 7]

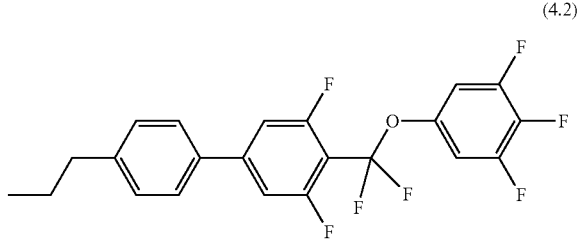

(4.2)

The component (A) may contain any one or both of these compounds; however, it is preferred that these compounds are appropriately used in combination in view of required performance. These compounds may be used in any combination; the component (A) preferably contains one or two of these compounds. The amount thereof is preferably not less than 3 mass %, more preferably 6 mass %, even more preferably 13 mass %, further preferably 20 mass %, and especially preferably 26 mass % relative to the total amount of the liquid crystal composition of the present invention.

In the liquid crystal composition of the present invention, the dielectrically positive component (A) may contain a compound selected from the group consisting of compounds represented by Formulae (6.1) to (6.4).

[Chem. 8]

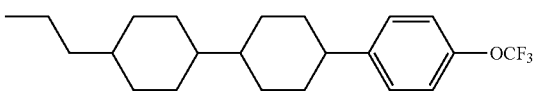

(6.1)

[Chem. 9]

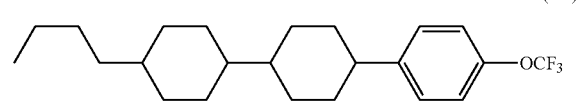

(6.2)

[Chem. 10]

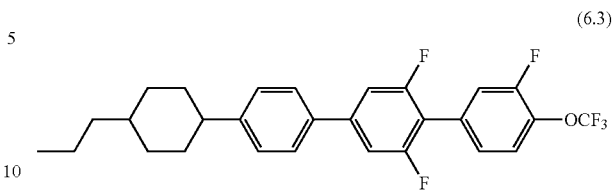

(6.3)

[Chem. 11]

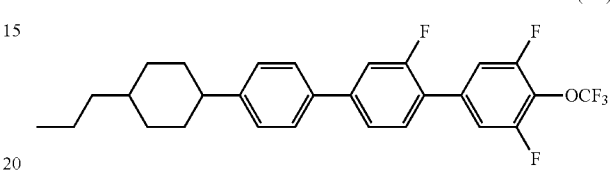

(6.4)

The component (A) may contain any one of or two or more of these compounds; however, it is preferred that these compounds are appropriately used in combination in view of required performance. In the case where low birefringence and low viscosity are required, a combination including the compound represented by Formula (6.1) or (6.2) may be employed; in the case where high Tni is required, a combination including the compound represented by Formula (6.3) or (6.4) may be employed. These compounds may be used in any combination; the component (A) preferably contains one to four of these compounds, and more preferably one to three of the compounds. The amount thereof is preferably not less than 2 mass %, more preferably not less than 6 mass %, even more preferably not less than 10 mass %, further preferably not less than 14 mass %, still further preferably not less than 18 mass %, and especially preferably not less than 21 mass % relative to the total amount of the liquid crystal composition of the present invention.

In the liquid crystal composition of the present invention, the dielectrically positive component (A) may contain a compound selected from the group consisting of compounds represented by Formulae (7.1) to (7.3).

[Chem. 12]

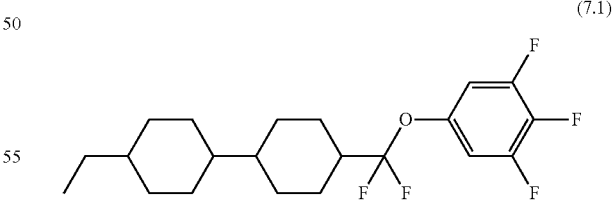

(7.1)

[Chem. 13]

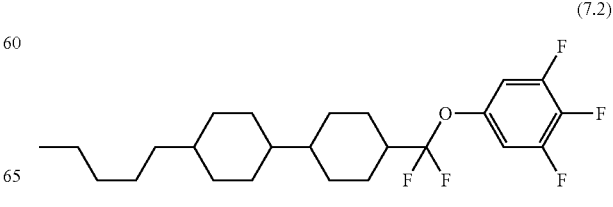

(7.2)

-continued

[Chem. 14]

(7.3)
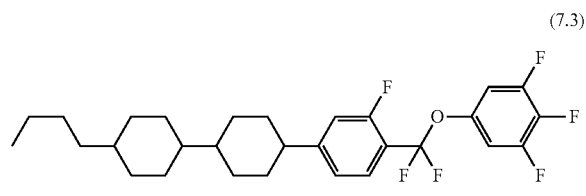

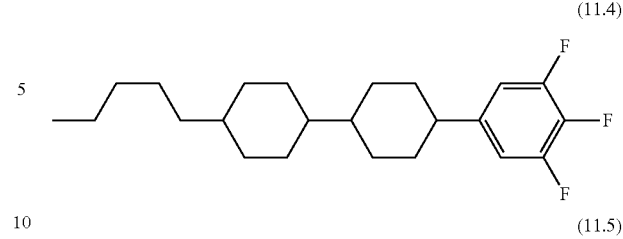
(11.4)

These compounds have different molecular weights based on the number of the structures of the alkyl groups at the terminals or the number of cyclic structures, and the amounts thereof are therefore appropriately adjusted to change the viscosity and Tni of the liquid crystal composition. For instance, the compound represented by Formula (7.3) has a high molecular weight and is therefore effectively used to enhance Tni; in contrast, the high molecular weight thereof contributes to an increase in viscosity. Hence, the positive component (A) preferably contains the compound represented by Formula (7.3) in an amount of 0.5 mass % or more and less than 15 mass %, and more preferably 0.5 mass % or more and less than 11 mass % relative to the total amount of the liquid crystal composition of the present invention. The positive component (A) preferably contains the compound represented by Formula (7.1) or (7.2) in an amount of 0.5 mass % or more and less than 20 mass %, more preferably 0.5 mass % or more and less than 14 mass %, further preferably 0.5 mass % or more and less than 10 mass %, and especially preferably 0.5 mass % or more and less than 8 mass % relative to the total amount of the liquid crystal composition of the present invention. These compounds may be used in any combination; the positive component (A) preferably contains one to three of these compounds, and more preferably one or two of the compounds.

In the liquid crystal composition of the present invention, the dielectrically positive component (A) may contain a compound selected from the group consisting of compounds represented by Formulae (11.1) to (11.7).

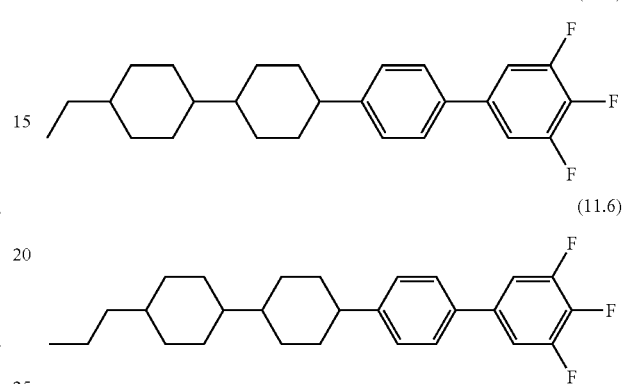

(11.5)

(11.6)

(11.7)

The compounds represented by Formulae (11.1) to (11.4) are effectively used to produce a liquid crystal composition having a large dielectric anisotropy (Δ∈) and a low birefringence, and the compounds represented by Formulae (11.5) to (11.7) are effectively used to produce a liquid crystal composition having, in addition to such properties, a high Tni. Hence, these compounds are appropriately used in combination in view of required birefringence and Tni. The component (A) preferably contains the compound represented by any of Formulae (11.1) to (11.7) in an amount of not less than 5 mass %, more preferably not less than 6 mass %, even more preferably not less than 9 mass %, further preferably not less than 10 mass %, and especially preferably not less than 13 mass % relative to the total amount of the liquid crystal composition of the present invention. These compounds may be used in any combination; the component (A) preferably contains one to five of these compounds, more preferably one to four of these compounds, and especially preferably one to of three compounds.

[Chem. 15]

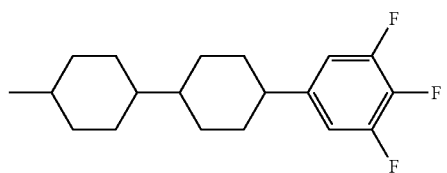
(11.1)

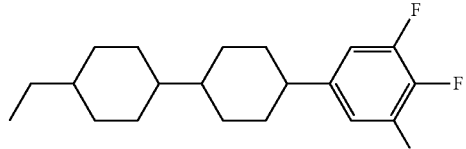
(11.2)

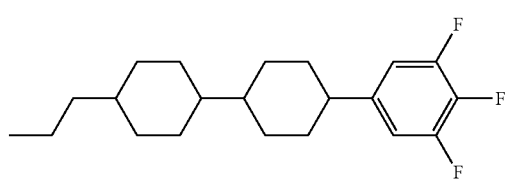
(11.3)

In the liquid crystal composition of the present invention, the dielectrically positive component (A) may contain a compound selected from the group consisting of compounds represented by Formulae (13.1) to (13.4).

[Chem. 16]

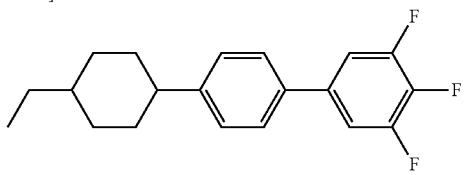
(13.1)

-continued

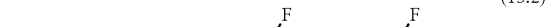
(13.2)

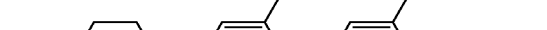
(13.3)

(13.4)

These compounds may be used in any combination; the component (A) preferably contains one to four of these compounds, and more preferably one to three of these compounds. The component (A) preferably contains the compound represented by any of Formulae (13.1) to (13.4) in an amount of 5 mass % or more and less than 30 mass %, more preferably 11 mass % or more and less than 28 mass %, and especially preferably 15 mass % or more and less than 27 mass % relative to the total amount of the liquid crystal composition of the present invention.

In the liquid crystal composition of the present invention, the dielectrically positive component (A) may contain a compound selected from the group consisting of compounds represented by Formulae (14.1) and (14.2).

[Chem. 17]

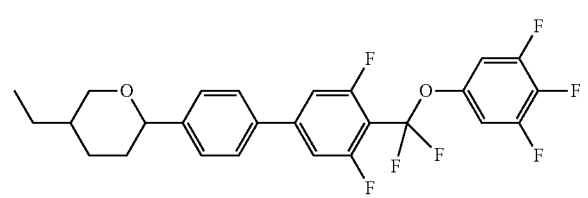
(14.1)

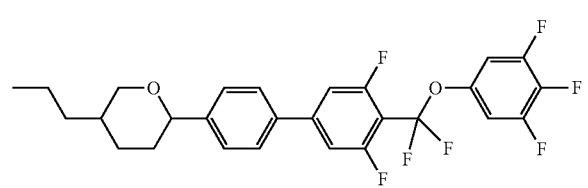
(14.2)

These compounds may be used in any combination; in view of resolvability and Tni, the component (A) preferably contains one or two of these compounds. The component (A) preferably contains a compound selected from the group consisting of the compounds represented by Formulae (14.1) and (14.2) in an amount of the not less than 7 mass %, more preferably not less than 9 mass %, and further preferably not less than 17 mass % relative to the total amount of the liquid crystal composition of the present invention.

In the liquid crystal composition of the present invention, the dielectrically positive component (A) may contain a compound selected from the group consisting of compounds represented by Formulae (15.1) to (15.3).

[Chem. 18]

(15.1)

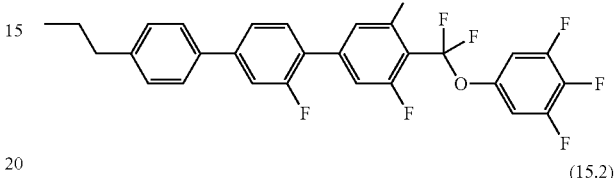
(15.2)

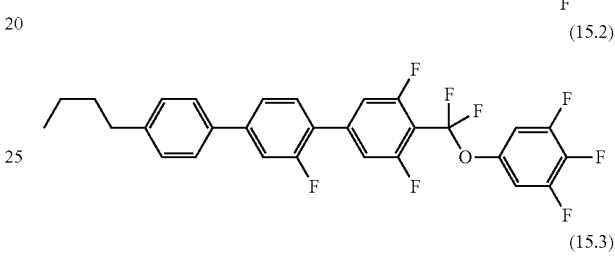
(15.3)

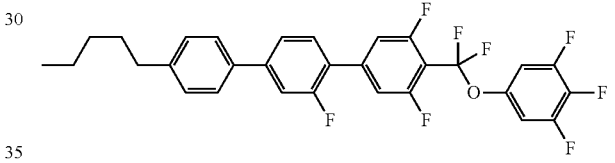

These compounds may be used in any combination; however, it is preferred that these compounds are appropriately used in combination in view of required performance. In the case where the component (A) contains one compound selected from the compounds represented by Formulae (15.1) to (15.3), the compound content is preferably not less than 10 mass %. In the case where the component (A) contains two compounds selected from the compounds represented by Formulae (15.1) to (15.3), the total amount of the compounds is not less than 21 mass %. In the case where the component (A) contains three compounds selected from the compounds represented by Formulae (15.1) to (15.3), the total amount of the compounds is not less than 24 mass %.

In the liquid crystal composition of the present invention, the dielectrically positive component (A) may contain a compound selected from the group consisting of compounds represented by Formulae (18.1) to (18.5).

[Chem. 19]

(18.1)

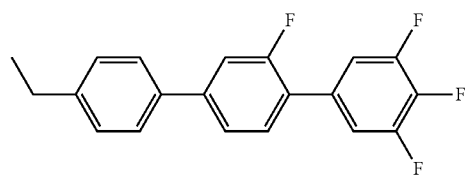

-continued

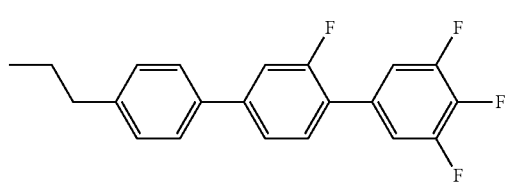
(18.2)

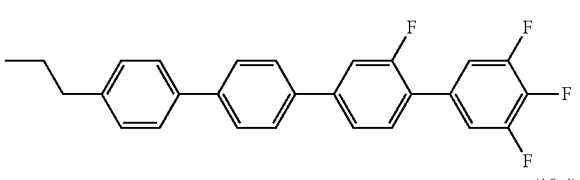
(18.3)

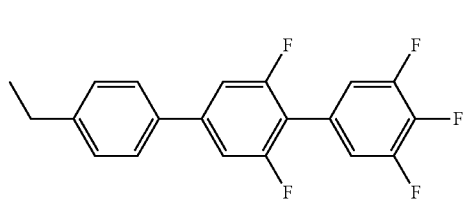
(18.4)

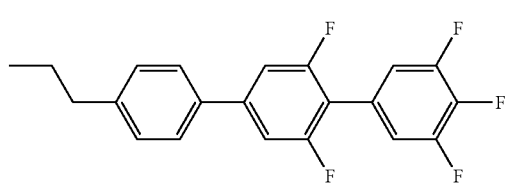
(18.5)

These compounds may be used in any combination; the component (A) preferably contains one to four of these compounds, and more preferably one to three of these compounds. The amount of these compounds contained in the component (A) is preferably not less than 3 mass % relative to the total amount of the liquid crystal composition of the present invention; in particular, it is more preferable that the amount of the compounds represented by Formulae (18.2) to (18.5) is not less than 11 mass % and that the amount of the compound represented by Formula (18.1) is 0.5 mass % or more and less than 5 mass %.

In the liquid crystal composition of the present invention, the dielectrically positive component (A) may contain a compound selected from the group consisting of compounds represented by Formulae (19.1) to (19.5).

[Chem. 20]

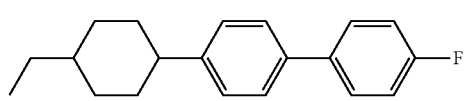
(19.1)

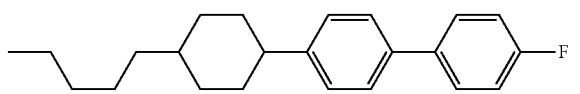
(19.2)

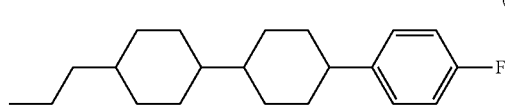
(19.3)

-continued

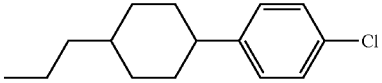
(19.4)

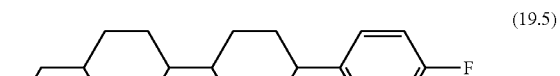
(19.5)

These compounds may be used in any combination; the component (A) preferably contains one to four of these compounds, and more preferably one to three of these compounds. The component (A) preferably contains a compound selected from the group consisting of the compounds represented by Formulae (19.2) to (19.5) in an amount of not less than 6 mass %, and more preferably not less than 8 mass % relative to the total amount of the liquid crystal composition of the present invention. The amount of the compound represented by Formula (19.5) in the component (A) is preferably 0.5 mass % or more and less than 4 mass relative to the total amount of the liquid crystal composition of the present invention.

In the liquid crystal composition of the present invention, the dielectrically positive component (A) may contain a compound selected from the group consisting of compounds represented by Formulae (20.1) to (20.3).

[Chem. 21]

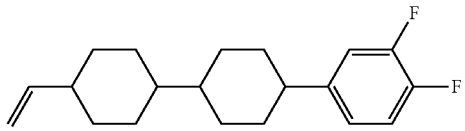
(20.1)

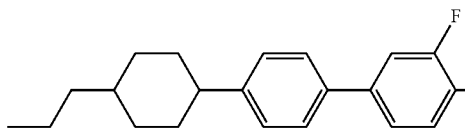
(20.2)

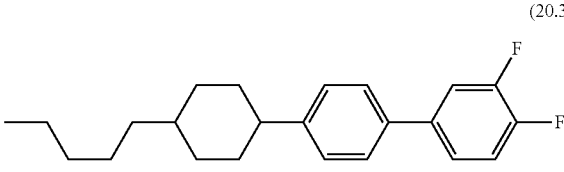
(20.3)

These compounds may be used in any combination; the component (A) preferably contains one to three of these compounds. The amount of these compounds contained in the component (A) is preferably not less than 6 mass %, and more preferably not less than 10 mass % relative to the total amount of the liquid crystal composition of the present invention.

The liquid crystal composition of the present invention contains a dielectrically neutral component (B). The component (B) contains a compound represented by Formula (2.1) or (2.2).

[Chem. 22]

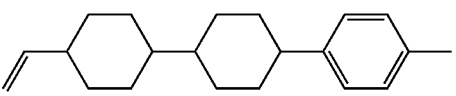

(2.1)

[Chem. 23]

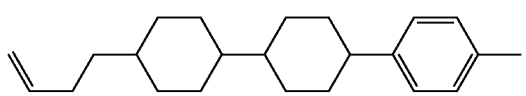

(2.2)

In the liquid crystal composition of the present invention, the amount of the compound contained in the component (B) and represented by Formula (2.2) is preferably 10 mass %, and more preferably not less than 15 mass % relative to the total amount of the liquid crystal composition of the present invention. In the case where the component (B) contains both the compounds represented by Formulae (2.1) and (2.2), the total amount of these components is preferably not less than 15 mass %, more preferably not less than 20 mass %, further preferably not less than 25 mass %, and especially preferably not less than 30 mass %.

In the liquid crystal composition of the present invention, the dielectrically neutral component (B) may contain a compound selected from the group consisting of compounds represented by Formulae (3.1) to (3.5).

[Chem. 24]

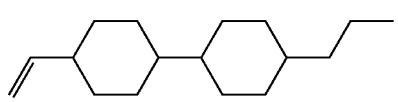

(3.1)

[Chem. 25]

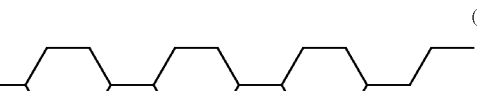

(3.2)

[Chem. 26]

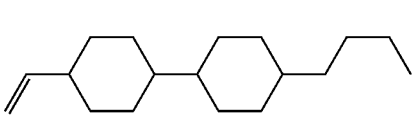

(3.3)

[Chem. 27]

(3.4)

[Chem. 28]

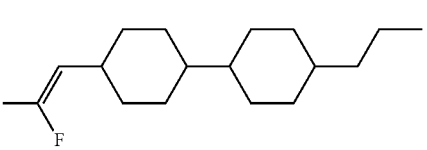

(3.5)

These compounds may be used in any combination; the component (B) preferably contains one to four, more preferably one to three, and especially preferably one or two of these compounds. The amount of the compounds contained in the component (B) and represented by Formulae (3.1) to (3.5) is preferably 19 mass %, more preferably not less than 21 mass %, even more preferably not less than 25 mass %, further preferably not less than 56 mass %, and especially preferably not less than 61 mass % relative to the total amount of the liquid crystal composition of the present invention.

In the liquid crystal composition of the present invention, the dielectrically neutral component (B) may contain a compound selected from the group consisting of compounds represented by Formulae (5.1) to (5.4).

[Chem. 29]

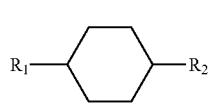

(5.1)

[Chem. 30]

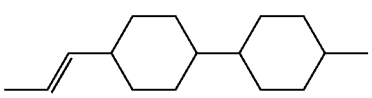

(5.2)

[Chem. 31]

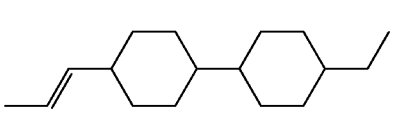

(5.3)

[Chem. 32]

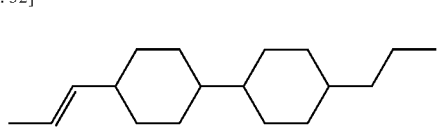

(5.4)

(In Formulae (5.1) to (5.4), $R_1$ and $R_2$ each independently represent a linear alkyl group or linear alkenyl group having 1 to 10 carbon atoms.) These compounds may be used in any combination; the component (B) preferably contains one to four, more preferably one to three, and especially preferably one or two of these compounds. The amount of the compounds contained in the component (B) and represented by Formulae (5.1) to (5.4) is preferably 6 mass %, more preferably not less than 14 mass %, even more preferably not less than 19 mass %, further preferably not less than 25 mass %, and especially preferably not less than 30 mass % relative to the total amount of the liquid crystal composition of the present invention.

In particular, preferred examples of the compound represented by Formula (5.1) include the following compounds.

[Chem. 33]

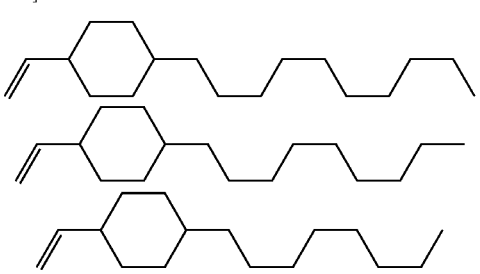

[Chem. 34]
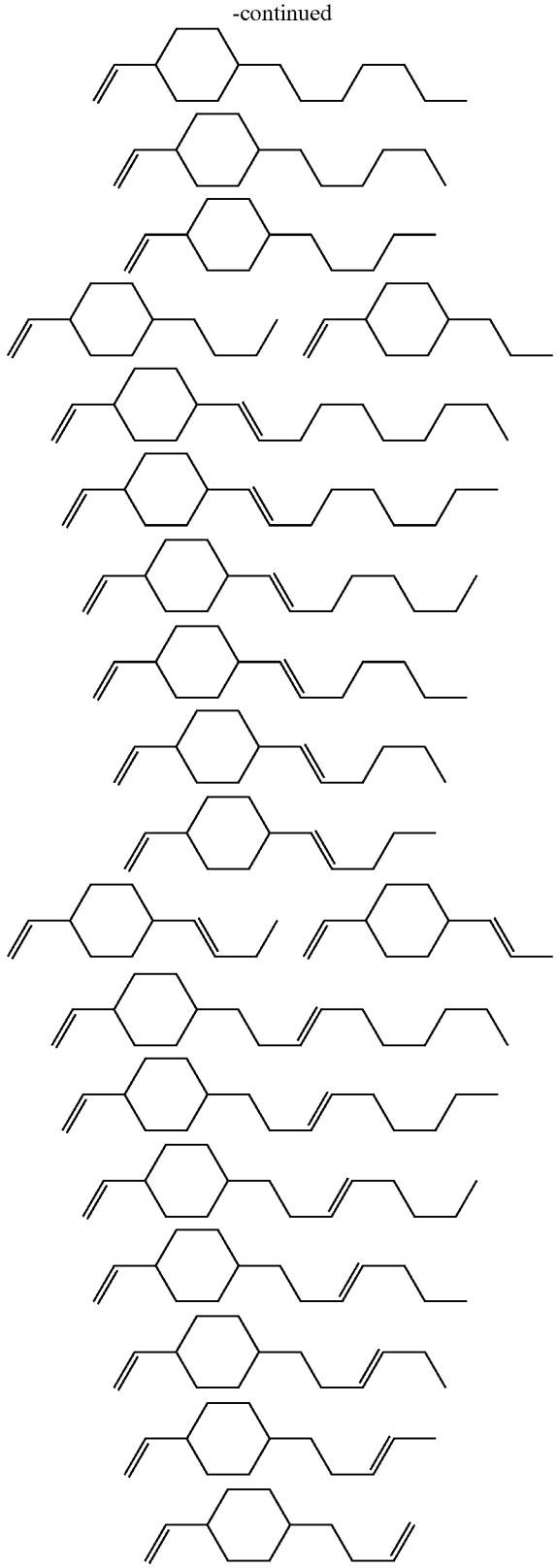
[Chem. 35]
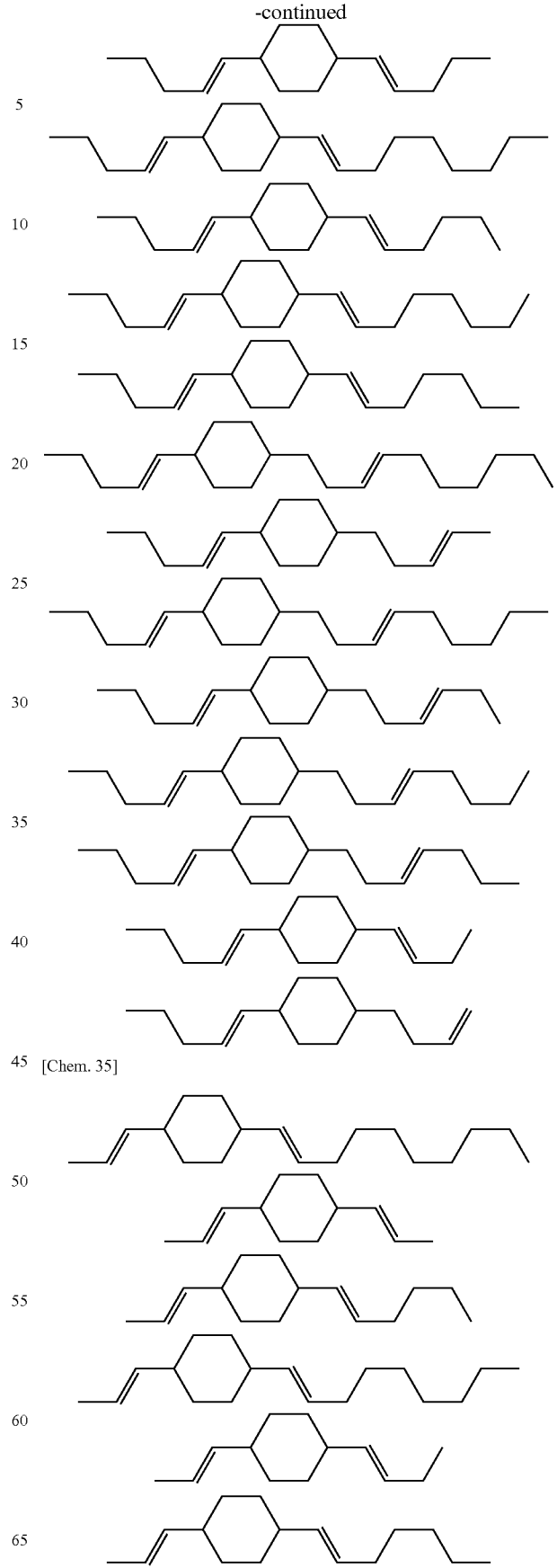

-continued
[Chem. 36]
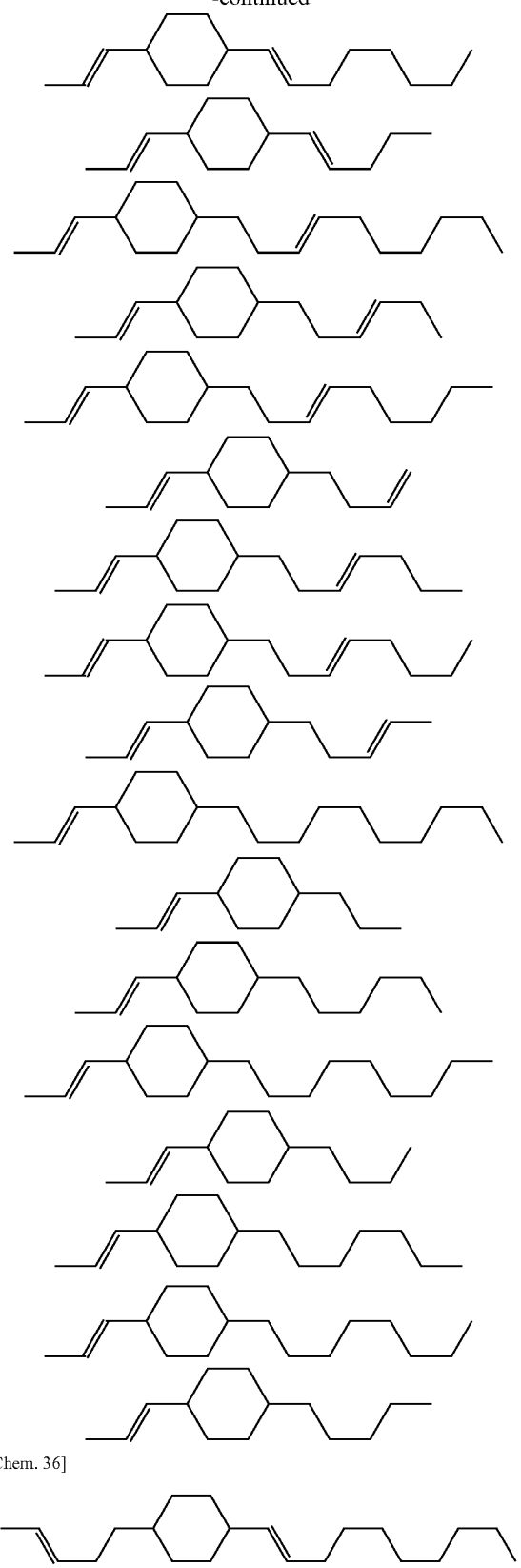
-continued
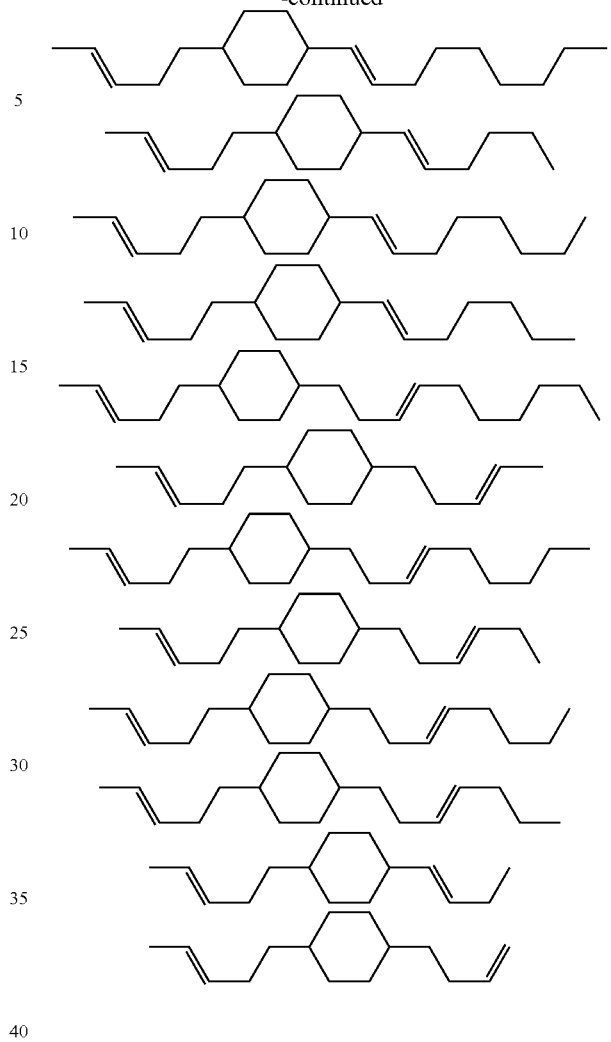
In the liquid crystal composition of the present invention, the dielectrically neutral component (B) may contain a compound selected from the group consisting of compounds represented by Formulae (8.1) to (8.4).
[Chem. 37]
(8.1)
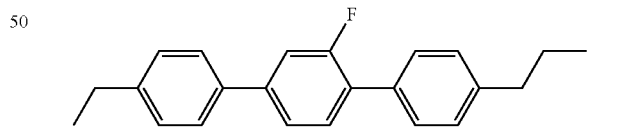
(8.2)
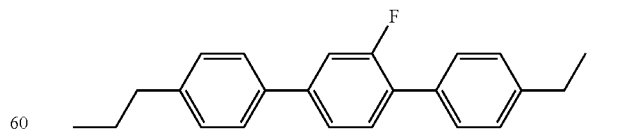
(8.3)
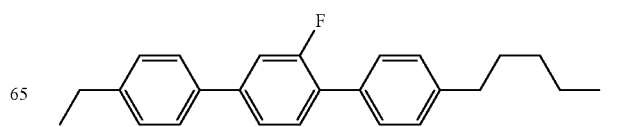

-continued (8.4)

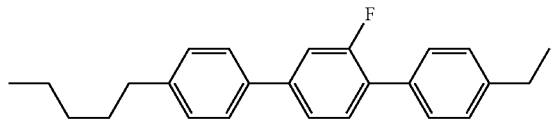

The component (B) may contain one of or two or more of these compounds; it is preferred that these compounds are appropriately used in combination in view of required refractive index anisotropy and resolvability at room temperature and below the freezing point. Note that resolvability is affected by the structure of the alkyl groups at both the terminals of the compound. The neutral component (B), for example, preferably contains the compound represented by Formula (8.1) or (8.2) in an amount of not less than 12 mass % relative to the total amount of the liquid crystal composition of the present invention or contains a compound selected from the group consisting of the compounds represented by Formulae (8.3) and (8.4) in an amount of 7 mass % or more and less than 15 mass %, and more preferably 11 mass % or more and less than 14 mass % relative to the total amount of the liquid crystal composition of the present invention.

Attention needs to be paid to that resolvability is affected by the structure of the alkyl groups at both the terminals of the compound. Use of a compound having a broad molecular weight distribution also has an effect on resolvability; preferably, for instance, one compound is selected from the compounds represented by Formulae (8.1) and (8.2), one compound is selected from the compounds represented by Formulae (8.3) and (8.4), and these selected compounds are appropriately used in combination.

In the liquid crystal composition of the present invention, the dielectrically neutral component (B) may contain a compound selected from the group consisting of compounds represented by Formulae (9.1) to (9.5).

[Chem. 38]

(9.1)

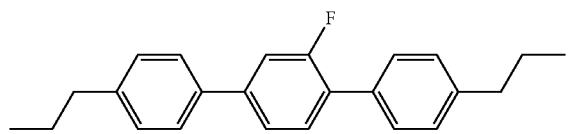

(9.2)

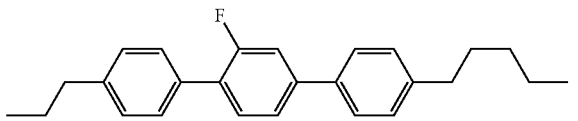

(9.3)

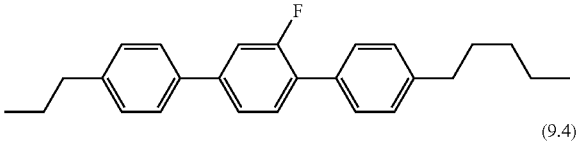

(9.4)

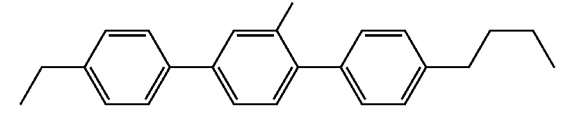

-continued (9.5)

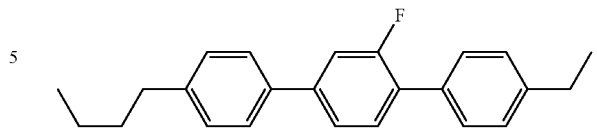

The component (B) may contain one of or two or more of these compounds; it is preferred that these compounds are appropriately used in combination in view of required refractive index anisotropy and resolvability at room temperature and below the freezing point. The component (B) preferably contains one to five, more preferably one to four, and especially preferably one to three of these compounds. The neutral component (B) preferably contains the compound represented by Formula (9.4) or (9.5) in an amount of 0.5 mass % or more and less than 5 mass % relative to the total amount of the liquid crystal composition of the present invention or preferably contains a compound selected from the group consisting of the compounds represented by Formulae (9.1) to (9.3) in an amount of 7 mass % or more and less than 15 mass %, and more preferably 11 mass % or more and less than 14 mass % relative to the total amount of the liquid crystal composition of the present invention.

Note that resolvability is affected by the structure of the alkyl groups at both the terminals of the compound. Use of a compound having a broad molecular weight distribution also has an effect on resolvability; preferably, for instance, one compound is selected from the compounds represented by Formulae (9.4) and (9.5), one compound is selected from the compounds represented by Formulae (9.2) and (9.3), and these selected compounds are appropriately used in combination.

In the liquid crystal composition of the present invention, the dielectrically neutral component (B) may contain compounds represented by Formulae (10.1) to (10.3).

[Chem. 39]

(10.1)

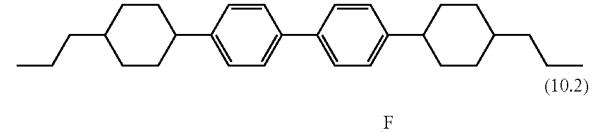

(10.2)

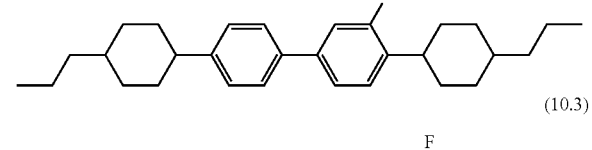

(10.3)

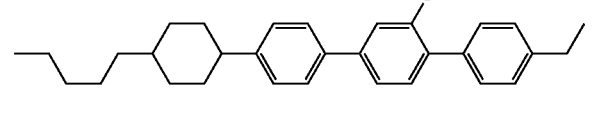

The component (B) preferably contains these compounds in an amount of not less than 4 mass %, more preferably not less than 7 mass %, and especially preferably not less than 10 mass % relative to the total amount of the liquid crystal composition of the present invention.

In the liquid crystal composition of the present invention, the dielectrically neutral component (B) may contain a compound selected from the group consisting of compounds represented by Formulae (12.1) and (12.2).

[Chem. 40]

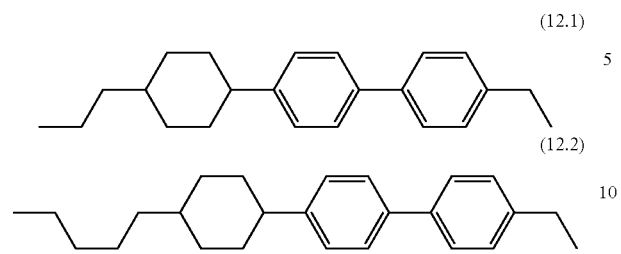

The component (B) preferably contains these compounds in an amount of 4 mass % or more, and more preferably 6 mass % or more and less than 10 mass % relative to the total amount of the liquid crystal composition of the present invention. These compounds may be used in any combination; the component (B) preferably contains one or two of these compounds.

In the liquid crystal composition of the present invention, the dielectrically neutral component (B) may contain a compound selected from the group consisting of compounds represented by Formulae (16.1) to (16.3).

[Chem. 41]

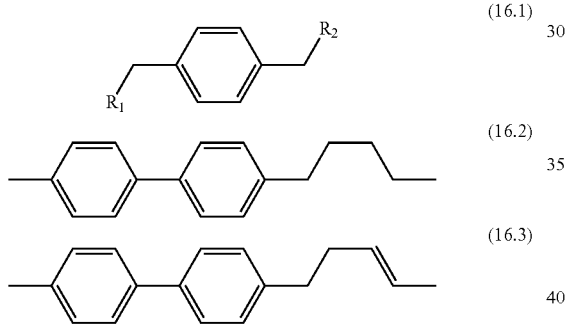

(In Formulae (16.1) to (16.3), $R_1$ and $R_2$ each independently represent a linear alkyl group or linear alkenyl group having 1 to 10 carbon atoms.) These compounds may be used in any combination; in view of refractive index anisotropy and Tni, the component (B) preferably contains one to four, and more preferably one to three of these compounds. The component (B) preferably contains a compound selected from the group consisting of the compounds represented by Formulae (16.1) to (16.3) in an amount of not less than 7 mass %, more preferably not less than 11 mass %, and further preferably not less than 17 mass % relative to the total amount of the liquid crystal composition of the present invention.

In particular, preferred examples of the compound represented by Formula (16.1) include the following compounds.

[Chem. 43]

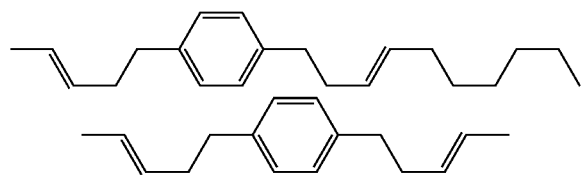

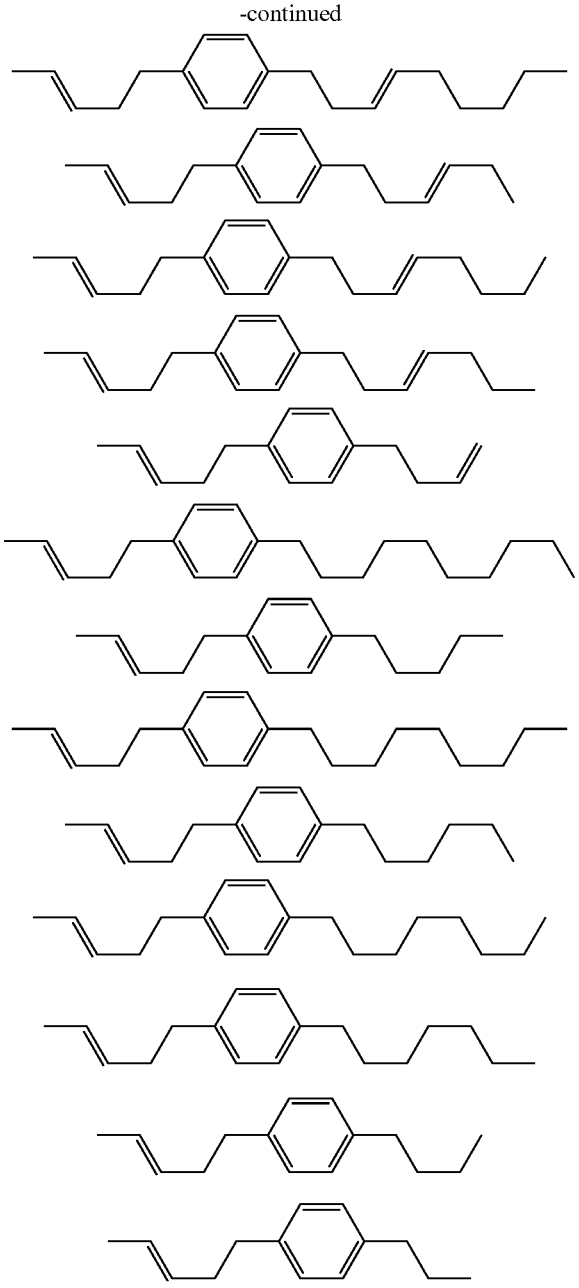

In the liquid crystal composition of the present invention, the dielectrically neutral component (B) may contain a compound selected from the group consisting of compounds represented by Formulae (17.1) and (17.2).

[Chem. 43]

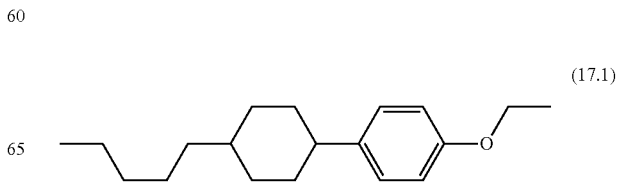

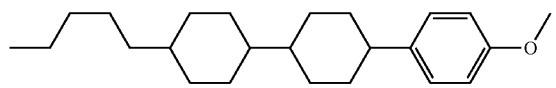
(17.2)

These compounds may be used in any combination and are preferably used alone or in combination. In view of required resolvability or another property, the component (B) preferably contains such a compound in an amount of not less than 6 mass % relative to the total amount of the liquid crystal composition of the present invention.

In the liquid crystal composition of the present invention, the dielectrically neutral component (B) may contain a compound selected from the group consisting of compounds represented by Formulae (21.1) to (21.3).

[Chem. 44]

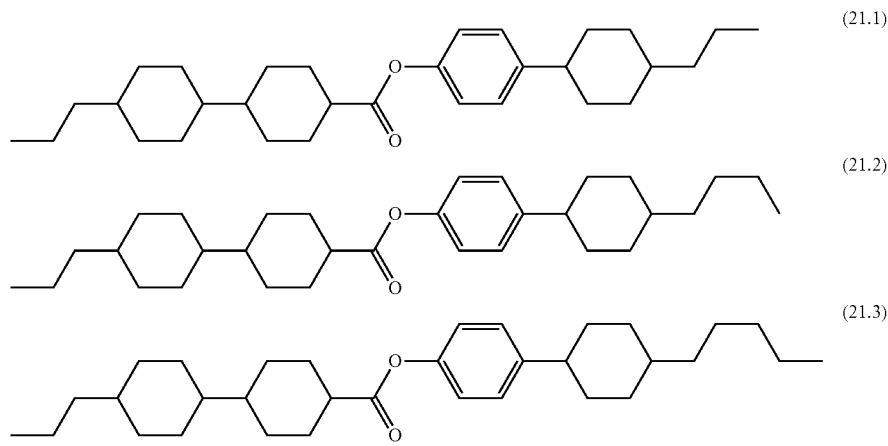

(21.1)

(21.2)

(21.3)

These compounds may be used in any combination; it is preferred that these compounds are appropriately used in combination in view of Tni, resolvability, and Δn. In particular, these compounds are preferably used alone or in combination of two or three.

The liquid crystal composition of the present invention containing not less than 73 mass % of the component (A) or containing not less than 81 mass % of the component (B) is also preferably used.

The Δ∈ of the liquid crystal composition of the present invention is +3.5 or higher at 25° C.; preferably in the range of +3.5 to +20.0, and more preferably +3.5 to +15.0. The Δn of the liquid crystal composition of the present invention ranges from 0.08 to 0.14 at 25° C., and preferably 0.09 to 0.13. In particular, the Δn is preferably in the range of 0.10 to 0.13 for a thin cell gap and is preferably in the range of 0.08 to 0.10 for a thick cell gap. The η of the liquid crystal composition of the present invention ranges from 10 to 45 mPa·s at 20° C.; preferably 10 to 25 mPa·s, and especially preferably 10 to 20 mPa·s. The Tni of the liquid crystal composition of the present invention is in the range of 60° C. to 120° C.; preferably 70° C. to 110° C., and especially preferably 75° C. to 90° C.

In addition to the above-mentioned compounds, the liquid crystal composition of the present invention may contain, for example, nematic liquid crystal, smectic liquid crystal, and cholesteric liquid crystal which are generally used.

The liquid crystal composition of the present invention may contain a polymerizable compound to produce a liquid crystal display device of, for instance, a PS mode. Examples of polymerizable compounds which can be used include photopolymerizable monomers which are polymerized by being exposed to an energy ray such as light; in terms of a structure, examples of the polymerizable compounds include polymerizable compounds having a liquid crystal skeleton to which multiple six-membered rings are connected, such as biphenyl derivatives and terphenyl derivatives. In particular, a bifunctional monomer represented by General Formula (V) is preferably employed.

[Chem. 45]

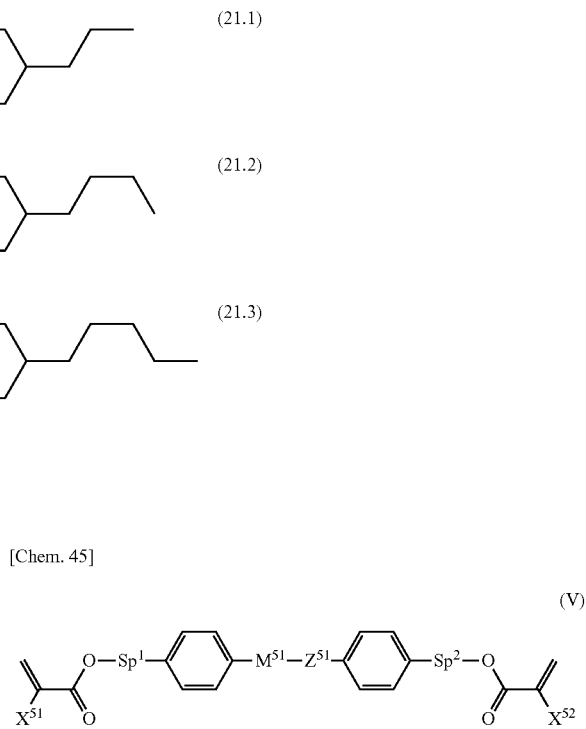

(V)

(In General Formula (V), $X^{51}$ and $X^{52}$ each independently represent a hydrogen atom or a methyl group, $Sp^1$ and $Sp^2$ each independently represent a single bond, an alkylene group having 1 to 8 carbon atoms, or —O—$(CH_2)$s- (where s is an integer from 2 to 7, and an oxygen atom is connected to an aromatic ring), $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY_1$=$CY_2$— (where $Y_1$ and $Y_2$ each independently represent a fluorine atom or a hydrogen atom), —C≡C—, or a single bond, and $M^{51}$ represents a 1,4-phenylene group, a trans-1,4-cyclohexylene group, or a single bond, where in the formula, any hydrogen atom of each 1,4-phenylene group may be replaced with a fluorine atom.)

Diacrylate derivatives in which $X^{51}$ and $X^{52}$ each represent a hydrogen atom and dimethacrylate derivatives in which $X^{51}$ and $X^{52}$ are each a methyl group are preferably employed, and compounds in which one of $X^{51}$ and $X^{52}$ represents a hydrogen atom and in which the other one thereof represents a methyl group are also preferably employed. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of an intended application. In PSA display devices, dimethacrylate derivatives are especially preferably employed.

$Sp^1$ and $Sp^2$ each independently represent a single bond, an alkylene group having 1 to 8 carbon atoms, or —O—$(CH_2)$s—; in an application to PSA display devices, at least one of $Sp^1$ and $Sp^2$ is preferably a single bond, and compounds in which each $Sp^1$ and $Sp^2$ represents a single bond or compounds in which one of $Sp^1$ and $Sp^2$ is a single bond and in which the other one thereof is an alkylene group having 1 to 8 carbon atoms or —O—$(CH_2)$s— are preferably employed. In this case, an alkyl group having 1 to 4 carbon atoms is preferably employed, and s preferably ranges from 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and especially preferably a single bond.

$M^{51}$ represents a 1,4-phenylene group in which any hydrogen atom may be replaced with a fluorine atom, a trans-1,4-cyclohexylene group, or a single bond, and a 1,4-phenylene group or a single bond is preferably employed. In the case where C represents a cyclic structure other than a single bond, $Z^{51}$ is preferably a linking group other than a single bond; in the case where $M^{51}$ is a single bond, $Z^{51}$ is preferably a single bond.

From these standpoints, it is particularly preferred that the cyclic structure between $Sp^1$ and $Sp^2$ in General Formula (V) has the following structure.

In General Formula (V), in the case where $M^{51}$ represents a single bond and where the cyclic structure includes two rings, the structure between $Sp^1$ and $Sp^2$ is preferably represented by Formulae (Va-1) to (Va-5), more preferably Formulae (Va-1) to (Va-3), and especially preferably Formula (Va-1).

[Chem. 46]

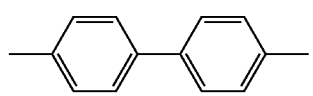
(Va-1)

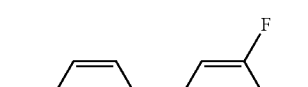
(Va-2)

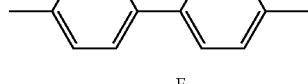
(Va-3)

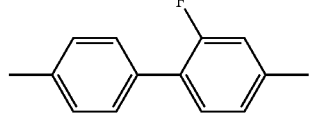
(Va-4)

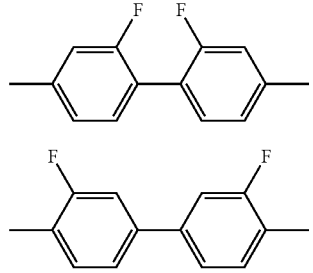
(Va-5)

(where both the terminals are separately connected to $Sp^1$ and $Sp^2$.)

In the case where polymerizable compounds having these skeletons are polymerized, the compounds exhibit alignment control force optimum for PSA-type liquid crystal display devices and give a good alignment state, so that display unevenness is reduced or does not occur at all.

From these viewpoints, monomers represented by General Formula (V-1) to (V-4) are especially preferably employed as a polymerizable monomer, and most preferably a monomer represented by General Formula (V-2).

[Chem. 47]

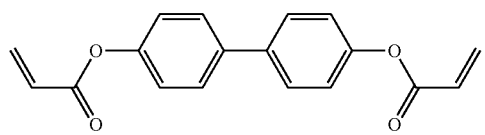
(V-1)

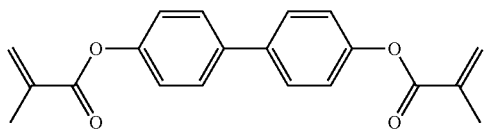
(V-2)

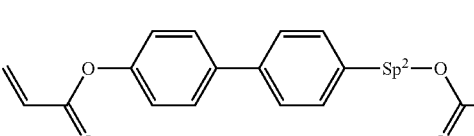
(V-3)

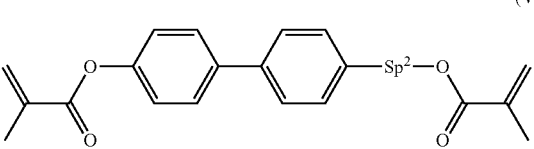
(V-4)

(where $Sp^2$ represents an alkylene group having 2 to 5 carbon atoms.)

Although polymerization progresses without a polymerization initiator in the case where the liquid crystal composition of the present invention contains the monomer, the liquid crystal composition may contain a polymerization initiator to promote polymerization. Examples of the polymerization initiator include benzoin ethers, benzophenones, acetophenones, benzyl ketals, and acyl phosphine oxides.

In the case where the liquid crystal composition of the present invention contains the polymerizable compound, the polymerizable compound is polymerized by being irradiated with ultraviolet light to develop a function of controlling alignment of liquid crystal molecules. Hence, such a liquid crystal composition can be used for liquid crystal display devices in which the birefringence by the liquid crystal composition is utilized to adjust the amount of transmitted light. Such a liquid crystal composition is useful for liquid crystal display devices such as AM-LCDs (active-matrix liquid crystal display devices), TNs (twisted nematic liquid crystal display devices), STN-LCDs (super-twisted nematic liquid crystal display devices), and OCB-LDCs; the liquid crystal composition is especially useful for AM-LCDs and can be used for transmissive or refractive liquid crystal display devices.

Two substrates of a liquid crystal cell included in a liquid crystal display device can be made of transparent materials having flexibility, such as glass or a plastic material, and one substrate may be made of a non-transparent material such as silicon. A transparent substrate having a transparent electrode layer can be produced by, for example, sputtering indium tin oxide (ITO) on a transparent substrate such as a glass plate.

A color filter can be produced by, for instance, a pigment dispersion technique, a printing technique, an electrodeposition technique, or a staining technique. In production of the color filter by, for example, a pigment dispersion technique, a curable colored composition used for a color filter is applied onto the transparent substrate, patterned, and then cured by being heated or irradiated with light. This process is carried out for each of colors of red, green, and blue, thereby being able to produce pixels of a color filter. Active elements such as a TFT, a thin-film diode, and a metal-insulator-metal specific resistance element may be provided on the substrate to form pixel electrodes.

The substrates are arranged so as to face each other such that the transparent electrode layer is disposed therebetween. In the arrangement of the substrates, a spacer may be disposed between the substrates to adjust the distance therebetween. In this case, the distance between the substrates is preferably adjusted such that the thickness of a light modulating layer to be formed is in the range of 1 to 100 μm, and more preferably 1.5 to 10 μm. In the case where a polarizing plate is used, the product of the refractive index anisotropy Δn of liquid crystal and a cell thickness d is preferably adjusted to achieve the maximum contrast. In the case where two polarizing plates are used, a polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, and photoresist materials. A sealing material such as a thermosetting epoxy composition is subsequently applied to the substrates by screen printing in a state in which a liquid crystal-injected port has been formed, thereby bonding the substrates to each other. Then, the sealing material is heated to be thermally cured.

The polymerizable compound-containing liquid crystal composition can be put into the space between the two substrates by a vacuum injection technique or ODF technique which is generally employed; however, a vacuum injection technique has a problem in which traces of injection remain while stains of liquid crystal droplets do not remain. The present invention can be more preferably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the liquid crystal composition is dropped onto part of the substrate surrounded by the applied sealing material in a degassed atmosphere, and then the frontplane and the backplane are bonded to each other, thereby manufacturing a liquid crystal display device. The liquid crystal composition of the present invention can be stably dropped in an ODF process and can be therefore desirably used.

Since a proper polymerization rate desirably enables development of a function of sufficiently aligning liquid crystal molecules, the polymerizable compound is preferably polymerized by being irradiated with one type of active energy rays, such as ultraviolet rays and electron beams, or by being irradiated with such active energy rays in combination or in sequence. In the use of ultraviolet rays, a polarized light source or a non-polarized light source may be used. In the case where the polymerizable compound-containing liquid crystal composition is polymerized in a state in which the composition is disposed between the two substrates, at least the irradiation-side substrate needs to have transparency suitable for the active energy rays. Another method may be used, in which after only the specific part is polymerized by being irradiated with light with a mask, the alignment state of non-polymerized part is changed by changing conditions such as an electric field, a magnetic field, or temperature, and then polymerization is further carried out through irradiation with active energy rays. In particular, ultraviolet exposure is preferably carried out while an alternating current electric field is applied to the polymerizable compound-containing liquid crystal composition. The alternating current electric field to be applied preferably has a frequency of 10 Hz to 10 kHz, and more preferably 60 Hz to 10 kHz, and the voltage is determined on the basis of a pretilt angle desirable for liquid crystal display devices. In other words, pretilt angles in liquid crystal display devices can be controlled by voltage to be applied. In MVA-mode liquid crystal display devices which involve use of a horizontal electric field, a pretilt angle is preferably controlled to 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically 15 to 35° C. Preferred examples of a lamp used for emitting ultraviolet rays include a metal halide lamp, a high-pressure mercury lamp, and an ultrahigh-pressure mercury lamp. In addition, ultraviolet rays to be emitted preferably has a wavelength that is in a wavelength region other than a wavelength region in which ultraviolet rays are absorbed by the liquid crystal composition; it is preferred that ultraviolet rays are appropriately cut off as needed. The intensity of ultraviolet rays to be emitted is preferably 0.1 mW/cm$^2$ to 100 W/cm$^2$, and more preferably 2 mW/cm$^2$ to 50 W/cm$^2$. The energy of the ultraviolet rays to be emitted can be appropriately adjusted; preferably 10 mJ/cm$^2$ to 500 J/cm$^2$, and more preferably 100 mJ/cm$^2$ to 200 J/cm$^2$. The intensity may be changed in ultraviolet exposure. The time of ultraviolet exposure is appropriately determined on the basis of the intensity of the ultraviolet rays to be emitted; preferably 10 seconds to 3600 seconds, and more preferably 10 seconds to 600 seconds.

Liquid crystal display devices using the liquid crystal composition of the present invention enable both quick response and a reduction in defective display and are therefore practical; in particular, the liquid crystal composition is useful to active-matrix-driving liquid crystal display devices and can be applied to VA-mode, PSVA-mode, and TN-mode liquid crystal display devices.

A liquid crystal display device according to a preferred embodiment of the present invention will now be described with reference to the drawings.

FIG. 1 is a cross-sectional view illustrating a liquid crystal display device including two substrates which face each other, a sealing material disposed between the substrates, and liquid crystal confined in a sealed region surrounded by the sealing material.

In particular, FIG. 1 illustrates a specific embodiment of a liquid crystal display device which includes a backplane including a substrate a 100, TFT layers 102 and pixel electrodes 103 each formed so as to overlie the substrate a 100, and a passivation film 104 and alignment film a 105 each formed so as to cover these components; a frontplane placed so as to face the backplane and including a substrate b 200, black matrix 202, color filter 203, planarization film (overcoat layer) 201, and transparent electrode 204 each formed so as to overlie the substrate b 200, and an alignment film b 205 formed so as to cover these components; a sealing material 301 disposed between the substrates; and a liquid crystal layer 303 confined in a sealed region surrounded by the sealing material. In addition, protrusions 304 are extending from a surface to which the sealing material 301 has been applied. Any substantially transparent material can be used for the substrate a or the substrate b, and glass, ceramic materials, and plastic materials can be used. Examples of materials used for a plastic substrate include cellulose derivatives such as cellulose, triacetyl cellulose, diacetyl cellulose; polyesters such as polycycloolefin derivatives, polyethylene terephthalate, and polyethylene naphthalate; polyolefins such as polypropylene and polyethylene; polycarbonate; polyvinyl alcohol; polyvinyl chloride; polyvinylidene chloride; polyamide; polyimide; polyimideamide; polystyrene; polyacrylate; polymethyl methacrylate; polyethersulfone; polyarylate; and inorganic-organic composite materials such as glass fiber-epoxy resin and glass fiber-acrylic resin.

In the case where the plastic substrate is used, a barrier film is preferably formed. The barrier film serves to reduce the moisture permeability of the plastic substrate and thus enhance the reliability on the electric properties of the liquid crystal display device. Any barrier film having high transparency and low water vapor permeability can be used; in general, a thin film formed of an inorganic material such as silicon oxide by vapor deposition, sputtering, or a chemical vapor deposition method (CVD method) can be used.

In the present invention, the substrates a and b may be formed of materials the same as or different from each other without limitation. Use of a glass substrate enables manufacturing of a liquid crystal display device exhibiting excellent thermal resistance and dimensional stability and is therefore preferably employed. A plastic substrate is suitable for manufacturing by a roll-to-roll process and appropriately enables weight saving and an increase in flexibility; hence, the plastic material is preferably employed. In order to impart flatness and thermal resistance to the substrate, a combination of a plastic substrate and a glass substrate can give a good result.

In Examples which will be described later, a glass substrate is used as a material of the substrate a 100 or the substrate b 200. In the backplane, the TFT layers 102 and the pixel electrodes 103 are formed so as to overlie the substrate a 100. These components are formed through an arraying process which is generally used. The passivation film 104 and the alignment film a 105 are formed so as to cover these components, thereby completing the formation of the backplane.

The passivation film 104 (also referred to as an inorganic protective film) is a film used for protecting the TFT layers; in general, a nitride film (SiNx), an oxide film (SiOx), or another film is formed by, for example, a chemical vapor deposition (CVD) technique.

The alignment film a 105 is a film which serves to align liquid crystal molecules; in general, a polymeric material, such as polyimide, is used in many cases. An alignment agent solution containing a polymeric material and a solvent is used as a coating liquid. The alignment film may reduce adhesion to the sealing material and is therefore applied in patterns in a sealed region. The alignment agent solution is applied by printing such as flexography or a liquid ejection technique such as an ink jet technique. The alignment agent solution which has been applied is temporarily dried to evaporate the solvent and then baked to be cured by cross-linking. Then, the cured product is subjected to an alignment treatment to develop an alignment function.

In general, a rubbing process is employed for an alignment treatment. The polymeric film produced as described above is unidirectionally rubbed with a rubbing cloth formed of a fibrous material such as rayon, which develops a function of aligning liquid crystal molecules.

A photo-alignment technique may be used. In a photo-alignment technique, polarized light is emitted onto an alignment film containing a photosensitive organic material to develop an alignment function, and damage of a substrate and generation of dusts which are both caused by a rubbing process do not occur. Examples of organic materials used in a photo-alignment technique include materials containing dichroic dyes. A material usable as a dichroic dye has a group (hereinafter referred to as photo-alignment group) which induces alignment of molecules by Weigert's effect due to photodichroism or which induces an optical reaction resulting in development of a function of aligning liquid crystal molecules, such as an isomerization reaction (e.g., azobenzene group), a dimerization reaction (e.g., cinnamoyl group), a photo-cross-linking reaction (e.g., benzophenone group), or a photodegradation reaction (e.g., polyimide group). After the applied alignment agent solution is temporarily dried to evaporate the solvent, the product is irradiated with light at certain polarization (polarized light), thereby being able to produce an alignment film which enables alignment in a certain direction. In the frontplane, the black matrix 202, the color filter 203, the planarization film 201, the transparent electrode 204, and the alignment film b 205 are formed so as to overlie the substrate b 200.

The black matrix 202 is formed by, for example, a pigment dispersion technique. In particular, a color resin liquid in which a black colorant has been uniformly dispersed for formation of the black matrix is applied onto the substrate b 200, thereby forming a color layer. The colored layer is subsequently cured by being baked. A photoresist is applied onto the cured layer and then preliminarily baked. The photoresist is exposed to light through a mask pattern and then developed to pattern the colored layer. Then, the photoresist layer is removed, and the colored layer is baked to complete the formation of the black matrix 202.

Alternatively, a photoresist-type pigment dispersion liquid may be used. In this case, a photoresist-type pigment dispersion liquid is applied, pre-baked, exposed to light through a mask pattern, and then developed to pattern the colored layer. Then, the photoresist layer is removed, and the colored layer is baked to complete the formation of the black matrix 202. The color filter 203 is formed by a pigment dispersion technique, an electrodeposition technique, a printing technique, or a staining technique. In a pigment dispersion technique, for example, a color resin solution in which a pigment (e.g., red) has been uniformly dispersed is applied onto the substrate b

200 and then cured by being baked, and a photoresist is applied onto the cured product and pre-baked. The photoresist is exposed to light through a mask pattern, then developed, and patterned. The photoresist layer is subsequently removed and baked again, thereby completing the formation of a (red) color filter 203. The color filter may be formed in any order of colors. A green color filter 203 and a blue color filter 203 are similarly formed. The transparent electrode 204 is formed so as to overlie the color filter 203 (the overcoat layer (201) is optionally formed on the color filter 203 to flatten a surface). The transparent electrode 204 preferably has a higher light transmittance and lower electric resistance. In formation of the transparent electrode 204, an oxide film of, for example, ITO is formed by sputtering.

In order to protect the transparent electrode 204, a passivation film is formed on the transparent electrode 204 in some cases.

The alignment film b 205 is the same as the above-mentioned alignment film a 105. Although a specific embodiment of the backplane and frontplane used in the present invention has been described, the present invention is not limited to this specific embodiment and freely modified to provide a desired liquid crystal display device. The columnar spacers may have any shape, and the horizontal cross section thereof may have any shape such as a circular, square, or polygonal shape; in particular, the horizontal cross section preferably has a circular shape or a regular polygonal shape in view of margin for misalignment in the formation process. Furthermore, such protrusions preferably have a shape of truncated cone or truncated pyramid. Any material which is insoluble in the sealing material, an organic solvent used in the sealing material, and liquid crystal can be used for the columnar spacers; a synthetic resin (curable resin) is preferably employed in terms of processability and a weight saving. The protrusions can be formed on a surface of a frontplane by photolithography or a droplet ejection technique, the surface being subjected to application of the sealing material. For such a reason, a photocurable resin suitable for photolithography and a droplet ejection technique is preferably employed.

An illustrative case in which the columnar spacers are formed by photolithography will now be described.

A resin solution (not containing a colorant) used for forming the columnar spacers is applied onto the transparent electrode 204 of the frontplane. Then, this layer of the applied resin solution is cured by being baked. A photoresist is applied onto the cured layer and then pre-baked. The photoresist is exposed to light through a mask pattern and then developed to pattern the resin layer. The photo resist layer is subsequently removed, and then the resin layer is baked to complete the formation of the columnar spacers.

Positions at which columnar spacers are to be formed can be appropriately determined on the basis of the mask patter. Accordingly, the inside of the sealed region and the outside thereof (sealing material-applied part) can be simultaneously formed in the liquid crystal display device. The columnar spacers are preferably formed above the black matrix to avoid degrading the quality of the sealed region. The columnar spacers formed by photolithography as described above are called column spacers or photo spacers in some cases.

The material used for forming the spacers is the mixture containing, for example, a negative water-soluble resin, such as a PVA-stilbazo photosensitive resin, a polyfunctional acrylic monomer, an acrylic acid copolymer, and a triazole-based initiator. In another technique, a color rein in which a colorant has been dispersed in a polyimide resin is used. In the present invention, any technique can be employed, and existing materials suitable for liquid crystal and sealing material to be used can be used to form the spacers.

After the columnar spacers are formed on part of the surface of the frontplane which serves as the sealed region in this manner, the sealing material (represented by the symbol 301 in FIG. 1) is applied to the target surface of the fronplane.

Any material can be used for the sealing material, and a curable resin composition prepared by adding a polymerization initiator to an epoxy-based or acrylic photocurable resin, thermosetting resin, or optically and thermally curable resin is used. Fillers containing inorganic or organic materials are added in some cases to adjust moisture permeability, an elastic modulus, and viscosity. Such fillers may have any shape such as a spherical shape, a fibrous shape, or an amorphous shape. Furthermore, a spherical or fibrous gap material having a single dispersion diameter may be mixed to properly control the cell gap, and a fibrous material which can be easily wound around the protrusions formed above the substrate may be mixed to enhance the adhesion to the plates. The diameter of the fibrous material used in this case is preferably approximately 1/5 to 1/10 of the cell gap, and the length of the fibrous material is preferably shorter than the width of an applied sealing material.

Any substance can be used for the fibrous material provided that the fibrous material can have a predetermined shape; synthetic fibers, such as cellulose, polyamide, and polyester, and inorganic materials, such as glass and carbon, can be appropriately selected.

The sealing material can be applied by a printing technique or a dispensing technique, and a dispensing technique involves use of a small amount of the sealing material and is therefore preferably employed. In general, the sealing material is applied to a position corresponding to the position of the black matrix to avoid adversely affecting the sealed region. In order to form a liquid crystal-dropped region used in the subsequent process (to prevent the liquid crystal from leaking), the sealing material is applied in the form of a closed loop.

Liquid crystal is dropped to the closed-loop structure (sealed region) of the frontplane, the closed-loop structure having been formed by application of the sealing material. In general, a disperser is used. Since the amount of liquid crystal to be dropped should be equivalent to the capacity of a liquid crystal cell, the amount is basically equal to the volume that is the product of the height of the columnar spacers and an area surrounded by the sealing material. In order to reduce the leakage of liquid crystal in a cell bonding process or optimize displaying characteristics, the amount of the liquid crystal to be dropped may be appropriately adjusted, or positions to which the liquid crystal are dropped may be dispersed.

Then, the backplane is bonded to the frontplane to which the sealing material has been applied and liquid crystal has been dropped. In particular, the frontplane and the backplane are attached to a stage having a mechanism for holding a substrate, such as an electrostatic chuck, and then the frontplane and the backplane are disposed at a position (in a distance) which enables the alignment film b of the frontplane to face the alignment film a of the backplane and which enables the sealing material not to contact the other side. In this state, pressure in the system is reduced. After the reduction in pressure, the positions of the frontplane and backplane are adjusted (alignment process) while the bonding parts of the frontplane and the backplane are confirmed. After the bonding parts are adjusted, the frontplane and backplane are moved to a position at which the sealing material on the frontplane contacts the backplane. In this state, the inside of the system is filled with inert gas, and the vacuum is gradually reduced and returned to normal pressure. In this process, atmospheric pressure enables the frontplane and the backplane to be bonded to each other, and the height of the columnar spacers defines a cell gap. In this state, the sealing material is irradiated with ultraviolet light to cure the sealing material, thereby forming the liquid crystal cell. Then, a heating process is optionally carried out to promote the curing of the sealing material. The heating process is carried out in many cases to enhance the adhesion of the sealing material and the reliability of electric properties.

EXAMPLES

Although the present invention will now be described further in detail with reference to Examples, the present invention is not limited thereto. The term "%" used for describing compositions of Examples and Comparative Examples refers to "mass %".

In Examples, the following properties were measured in the accompanying units.

Phase transition (Tni): nematic phase-isotropic liquid phase transition temperature (° C.)

Birefringence (Δn): refractive index anisotropy at 25° C.

Dielectric anisotropy (Δ∈): dielectric anisotropy at 25° C.

Viscosity (η): viscosity (mPa·s) at 20° C.

Rotational viscosity (γ1): rotational viscosity (mPa·s) at 25° C.

Voltage holding ratio (VHR): voltage holding ratio (%) at 60° C., a frequency of 60 Hz, and a voltage of 1 V Screen Burn-in:

In order to evaluate the occurrence of screen burn-in in a liquid crystal display device, a uniform display was carried out on the entire display screen after a certain fixed pattern had been displayed in a displaying area for 1000 hours, and the degree of the residual image of the fixed pattern was visually observed. Result of the observation was evaluated on the basis of the following four criteria.

A: No residual image
B: Slight residual image, but acceptable
C: Unacceptable residual image
D: Poor quality with residual image Stains of Liquid Crystal Droplets:

In order to evaluate stains of liquid crystal droplets in a liquid crystal display device, white stains of liquid crystal droplets which emerged in an entirely-black display mode were visually observed. Result of the observation was evaluated on the basis of the following four criteria.

A: No stains of liquid crystal droplets
B: Slight stains of liquid crystal droplets, but acceptable
C: Unacceptable stains of liquid crystal droplets
D: Poor quality with stains of liquid crystal droplets Process Compatibility:

In an ODF process, 50 pL of liquid crystal was dropped 100000 times with a constant volume metering pump, and every 100-times dropping was defined as one cycle such as "0 to 100, 101 to 200, 201 to 300 . . . , and 99901 to 100000". A variation in the amount of dropped liquid crystal between individual cycles was evaluated for process compatibility on the basis of the following four criteria.

A: Significantly small variation (stable manufacturing of liquid crystal display device)
B: Slight variation, but acceptable
C: Unacceptable variation (occurrence of unevenness resulting in decreased yield)
D: Poor quality with variation (leakage of liquid crystal and generation of vacuum bubble)

Resolvability at Low Temperature:

In order to evaluate resolvability at low temperature, a liquid crystal composition was prepared, the liquid crystal composition was weighted to 1 g in a 2 mL sample bottle, and the sample bottle was subjected to a continuous temperature change in a temperature controlled chamber in the following cycle: −20° C. (retained for an hour)→heating (0.1° C./min)→0° C. (retained for an hour)→heating (0.1° C./min)→20° C. (retained for an hour)→cooling (−0.1° C./min)→0° C. (retained for an hour)→cooling (−0.1° C./min)→−20° C. Then, precipitate generated in the liquid crystal composition was visually observed, and result of the observation was evaluated on the basis of the following four criteria.

A: No precipitate for at least 600 hours
B: No precipitate for at least 300 hours
C: Precipitate observed within 150 hours
D: Precipitate observed within 75 hours In Examples, the following symbols are used to describe compounds.

(Cyclic Structure)

[Chem. 48]

(Structure of Side Chains and Bonding Structure)

TABLE 1

| n (number) at terminal | $C_nH_{2n+1}$— |
|---|---|
| —nd0FF— | —$(CH_2)_{n-1}$—HC=CFF |
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —OCFFF | —$OCF_3$ |
| —CFFF | —$CF_3$ |

TABLE 1-continued

| n (number) at terminal | $C_nH_{2n+1}$— |
|---|---|
| —On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_m$— |
| —Ondm | —O—$(CH_2)_{n-1}$—HC=CH— |
| -ndm- | —$(CH_2)_{n-1}$—HC=CH—$(CH_2)_{m-1}$— |
| —CN | —C≡N |
| —T— | —C≡C— |

Example 1

The following liquid crystal composition LC-1 was prepared.

Chem. 49

| Chemical structure | Ratio (%) | Abbreviation |
|---|---|---|
|  | 7 | 3-Cy-y-1d1 |
|  | 19 | 3-Cy-Cy-1d0 |
|  | 5 | 5-Cy-Ph-02 |
|  | 14 | 0d3-Cy-Cy-Ph-1 |
|  | 11 | 2-Cy-Ph-Ph3-F |
|  | 11 | 3-Cy-Ph-Ph3-F |
|  | 7 | 3-Ph-Ph3-CFFO-Ph3-F |
|  | 3 | 3-Cy-Cy-VO-Ph-Cy-3 |

Chem. 49 -continued

| Chemical structure | Ratio (%) | Abbreviation |
|---|---|---|
| 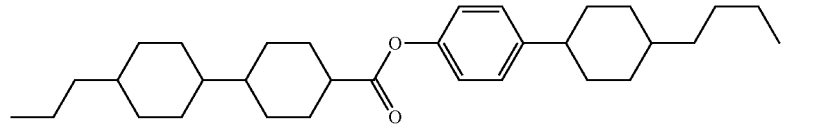 | 3 | 3-Cy-Cy-VO-Ph-Cy-4 |
| 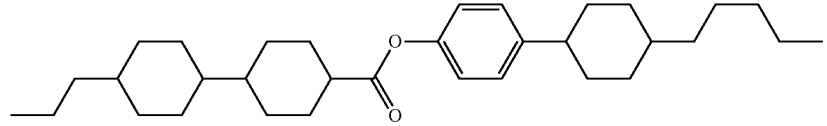 [SMILES: CCCCCC1CCC(c2ccc(OC(=O)C3CCC(C4CCC(CCC)CC4)CC3)cc2)CC1] | 3 | 3-Cy-Cy-VO-Ph-Cy-5 |
| 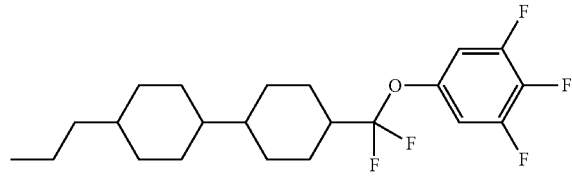 [SMILES: CCCC1CCC(C2CCC(C(F)(F)Oc3cc(F)c(F)c(F)c3)CC2)CC1] | 17 | 3-Cy-Cy-CFFO-Ph3-F |

The LC-1 had the following physical properties.

TABLE 2

| Transition point | 98.3 |
|---|---|
| Birefringence | 0.097 |
| Dielectric anisotropy | 5.6 |
| Viscosity | 18 |
| Rotational viscosity | 80 |

The initial VHR of the liquid crystal composition LC-1 was 99.0%, and the VHR of the liquid crystal composition LC-1 which had been left to stand at a high temperature of 150° C. for an hour was 98.5%. The resolvability at low temperature was evaluated, and excellent result of the evaluation was exhibited as shown in Table 3. The liquid crystal composition LC-1 was used to manufacture a TN liquid crystal display device through an ODF process, and screen burn-in, stains of liquid crystal droplets, and process compatibility were evaluated in the manner described above. Excellent results of the evaluations were exhibited as shown in Table 3.

TABLE 3

| Screen burn-in | A |
|---|---|
| Stains of liquid crystal droplets | A |
| Process compatibility | A |
| Resolvability at low temperature | A |

Comparative Example 1

The following liquid crystal composition LC-2 not containing the compound represented by Formula (1) was prepared.

Chem. 50

| Chemical structure | Ratio (%) | Abbreviation |
|---|---|---|
| 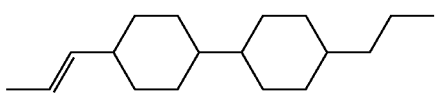 | 7 | 3-Cy-Cy-1d1 |
| 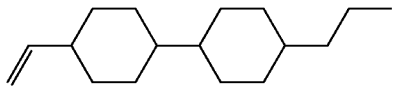 | 19 | 3-Cy-Cy-1d0 |
| 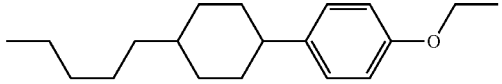 [SMILES: CCCCCC1CCC(c2ccc(OCC)cc2)CC1] | 5 | 5-Cy-Ph-O2 |

Chem. 50 -continued

| Chemical structure | Ratio (%) | Abbreviation |
|---|---|---|
| | 14 | Od1-Cy-Cy-Ph-1 |
| | 11 | 2-Cy-Ph-P3-F |
| | 11 | 3-Cy-Ph-Ph3-F |
| | 7 | 3-Ph-Ph3-CFFO-Ph3-F |
| | 3 | 3-Cy-Cy-VO-Ph-Cy-3 |
| | 3 | 3-Cy-Cy-VO-Ph-Cy-4 |
| | 3 | 3-Cy-Cy-VO-Ph-Cy-5 |
| | 17 | 4-Cy-Cy-CFFO-Ph3-F |

The LC-2 had the following physical properties.

TABLE 4

| Transition point | 96.8 |
|---|---|
| Birefringence | 0.097 |
| Dielectric anisotropy | 5.2 |
| Viscosity | 20 |
| Rotational viscosity | 92 |

As compared with the liquid crystal composition LC-1 containing the compound represented by Formula (1), the liquid crystal composition LC-2 not containing the compound represented by Formula (1) had a larger viscosity and rotational viscosity. The initial VHR of the liquid crystal composition LC-2 was 99.0%, and the VHR of the liquid crystal composition LC-2 which had been left to stand at a high temperature of 150° C. for an hour was 98.4%. The resolvability at low temperature was evaluated; in the evaluation, precipitation was observed earlier than LC-1 as shown in Table 5.

The liquid crystal composition LC-2 was used to manufacture a TN liquid crystal display device, and screen burn-in, stains of liquid crystal droplets, and process compatibility were evaluated in the manner described above. Results of the evaluations were inferior to those in Example 1 as shown in Table 5.

TABLE 5

| Screen burn-in | C |
|---|---|
| Stains of liquid crystal droplets | D |
| Process compatibility | D |
| Resolvability at low temperature | C |

Example 2

The following liquid crystal composition LC-3 was prepared.

Chem. 51

| Chemical structure | Ratio (%) | Abbreviation |
|---|---|---|
| | 7 | 3-Cy-Cy-1d1 |
| | 19 | 3-Cy-Cy-1d0 |
| | 5 | 5-Cy-Ph-02 |
| | 14 | 0d3-Cy-Cy-Ph-1 |
| | 11 | 2-Cy-Ph-Ph3-F |
| | 11 | 3-Cy-Ph-Ph3-F |
| | 7 | 3-Ph-Ph3-CFFO-Ph3-F |

Chem. 51

| Chemical structure | Ratio (%) | Abbreviation |
|---|---|---|
| (structure) | 3 | 3-Cy-Cy-VO-Ph-Cy-3 |
| (structure) | 3 | 3-Cy-Cy-VO-Ph-Cy-4 |
| (structure) | 3 | 3-Cy-Cy-VO-Ph-Cy-5 |
| (structure) | 17 | 3-Cy-Cy-CFFO-Ph3-F |

The LC-3 had the following physical properties.

TABLE 6

| Transition point | 101.6 |
|---|---|
| Birefringence | 0.097 |
| Dielectric anisotropy | 5.6 |
| Viscosity | 17 |
| Rotational viscosity | 91 |

The initial VHR of the liquid crystal composition LC-3 was 99.6%, and the VHR of the liquid crystal composition LC-3 which had been left to stand at a high temperature of 150° C. for an hour was 98.8%. The resolvability at low temperature was evaluated, and excellent result of the evaluation was exhibited as shown in Table 7. The liquid crystal composition LC-3 was used to manufacture a TN liquid crystal display device through an ODF process, and screen burn-in, stains of liquid crystal droplets, and process compatibility were evaluated in the manner described above. Excellent results of the evaluations were exhibited as shown in Table 7.

TABLE 7

| Screen burn-in | A |
|---|---|
| Stains of liquid crystal droplets | A |
| Process compatibility | A |
| Resolvability at low temperature | A |

Comparative Example 2

The following liquid crystal composition LC-4 not containing the compound represented by Formula (1) was prepared.

Chem. 52

| Chemical structure | Ratio (%) | Abbreviation |
|---|---|---|
| (structure) | 7 | 3-Cy-Cy-1d1 |
| (structure) | 19 | 3-Cy-Cy-1d0 |
| (structure) | 5 | 5-Cy-Ph-O2 |

-continued
| Chem. 52 | | |
|---|---|---|
| Chemical structure | Ratio (%) | Abbreviation |
| 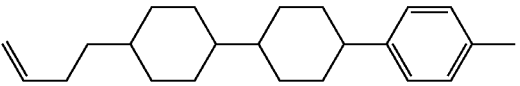 [SMILES: C=CCCC1CCC(C2CCC(c3ccc(C)cc3)CC2)CC1] | 14 | 0d3-Cy-Cy-Ph-1 |
| 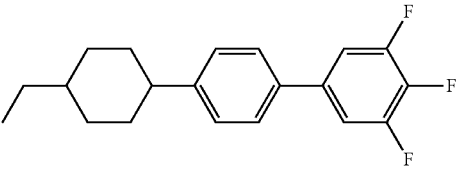 [SMILES: CCC1CCC(c2ccc(-c3cc(F)c(F)c(F)c3)cc2)CC1] | 11 | 2-Cy-Ph-Ph3-F |
| 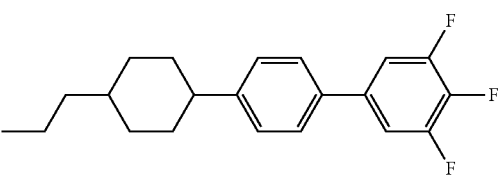 | 11 | 3-Cy-Ph-Ph3-F |
| 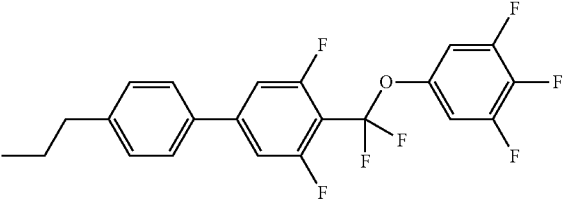 [SMILES: CCCc1ccc(-c2cc(F)c(C(F)(F)Oc3cc(F)c(F)c(F)c3)c(F)c2)cc1] | 7 | 3-Ph-Ph3-CFFO-Ph3-F |
| 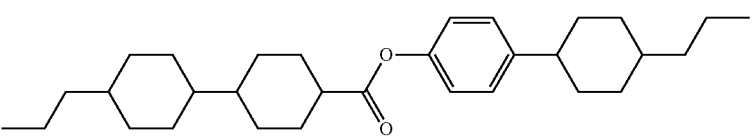 [SMILES: CCCC1CCC(c2ccc(OC(=O)C3CCC(C4CCC(CCC)CC4)CC3)cc2)CC1] | 3 | 3-Cy-Cy-VO-Ph-Cy-3 |
| 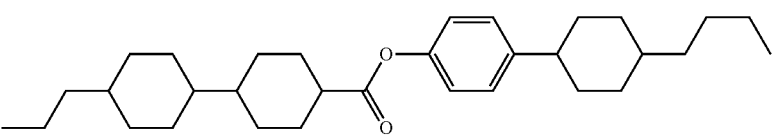 [SMILES: CCCCC1CCC(c2ccc(OC(=O)C3CCC(C4CCC(CCC)CC4)CC3)cc2)CC1] | 3 | 3-Cy-Cy-VO-Ph-Cy-4 |
| 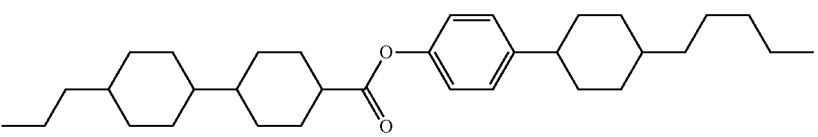 [SMILES: CCCCCC1CCC(c2ccc(OC(=O)C3CCC(C4CCC(CCC)CC4)CC3)cc2)CC1] | 3 | 3-Cy-Cy-VO-Ph-Cy-5 |
| 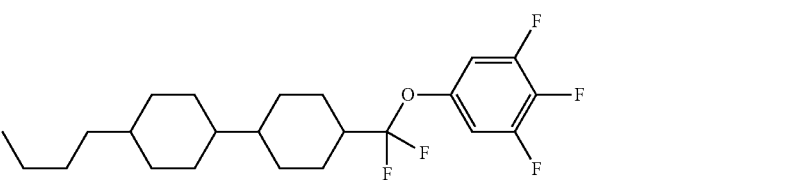 [SMILES: CCCCC1CCC(C2CCC(C(F)(F)Oc3cc(F)c(F)c(F)c3)CC2)CC1] | 17 | 4-Cy-Cy-CFFO-Ph3-F |

The LC-4 had the following physical properties.

TABLE 8

| Transition point | 100.1 |
|---|---|
| Birefringence | 0.097 |
| Dielectric anisotropy | 5.2 |
| Viscosity | 19 |
| Rotational viscosity | 105 |

As compared with the liquid crystal composition LC-3 containing the compound represented by Formula (1), the liquid crystal composition LC-4 not containing the compound represented by Formula (1) had a larger rotational viscosity. The initial VHR of the liquid crystal composition LC-4 was 99.5%, and the VHR of the liquid crystal composition LC-4 which had been left to stand at a high temperature of 150° C. for an hour was 98.5%. The resolvability at low temperature was evaluated; in the evaluation, precipitation was observed earlier than the LC-3 as shown in Table 9.

The liquid crystal composition LC-4 was used to manufacture a TN liquid crystal display device, and screen burn-in, stains of liquid crystal droplets, and process compatibility were evaluated in the manner described above. Results of the evaluations were inferior to those in Example 2 as shown in Table 9.

TABLE 9

| Screen burn-in | C |
|---|---|
| Stains of liquid crystal droplets | D |
| Process compatibility | C |
| Resolvability at low temperature | D |

Example 3

The following liquid crystal composition LC-5 was prepared, and the physical properties thereof were measured. Results of the measurement are shown in Table 10.

Chem. 53

| Chemical structure | Ratio (%) | Abbreviation |
|---|---|---|
| 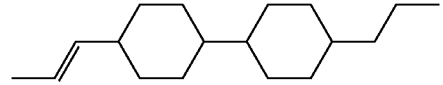 | 2 | 3-Cy-Cy-1d1 |
| 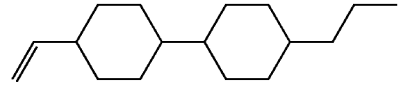 [SMILES: C=CC1CCC(C2CCC(CCC)CC2)CC1] | 15 | 3-Cy-Cy-1d0 |
| 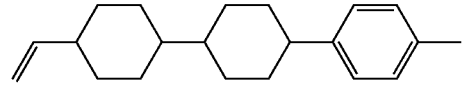 [SMILES: C=CC1CCC(C2CCC(c3ccc(C)cc3)CC2)CC1] | 15 | 0d1-Cy-Cy-Ph-1 |
| 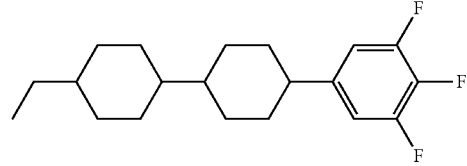 | 8 | 2-Cy-Cy-Ph3-F |
| 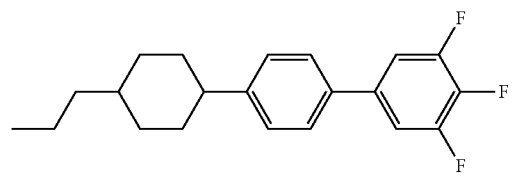 [SMILES: CCCC1CCC(c2ccc(-c3cc(F)c(F)c(F)c3)cc2)CC1] | 9 | 3-Cy-Ph-Ph3-F |
| 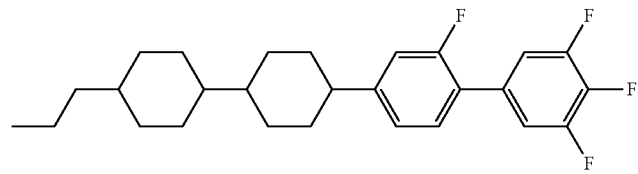 [SMILES: CCCC1CCC(C2CCC(c3ccc(-c4cc(F)c(F)c(F)c4)c(F)c3)CC2)CC1] | 3 | 3-Cy-Cy-Ph2-Ph3-F |
| 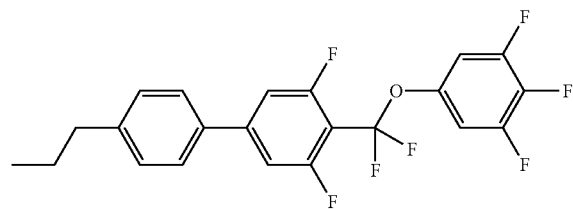 [SMILES: CCCc1ccc(-c2cc(F)c(C(F)(F)Oc3cc(F)c(F)c(F)c3)c(F)c2)cc1] | 11 | 3-Ph-Ph3-CFFO-Ph3-F |

-continued

Chem. 53

| Chemical structure | Ratio (%) | Abbreviation |
| --- | --- | --- |
| (structure with F) | 3 | 2-Ph-Ph2-Ph-3 |
| (structure with F) | 3 | 2-Ph-Ph2-Ph-4 |
| (structure with OCF$_3$) | 14 | 3-Cy-Cy-Ph-OCFFF |
| (structure with OCF$_2$-Ph-F$_3$) | 17 | 3-Cy-Cy-CFFO-Ph3-F |

The LC-5 had the following physical properties.

TABLE 10

| | |
| --- | --- |
| Transition point | 90.4 |
| Birefringence | 0.099 |
| Dielectric anisotropy | 9.1 |
| Viscosity | 17 |
| Rotational viscosity | 76 |

The initial VHR of the liquid crystal composition LC-5 was 99.2%, and the VHR of the liquid crystal composition LC-5 which had been left to stand at a high temperature of 150° C. for an hour was 98.4%. The resolvability at low temperature was evaluated, and excellent result of the evaluation was exhibited as shown in Table 11. The liquid crystal composition LC-5 was used to manufacture a TN liquid crystal display device through an ODF process, and screen burn-in, stains of liquid crystal droplets, and process compatibility were evaluated in the manner described above. Excellent results of the evaluations were exhibited as shown in Table 11.

TABLE 11

| | |
| --- | --- |
| Screen burn-in | A |
| Stains of liquid crystal droplets | A |
| Process compatibility | A |
| Resolvability at low temperature | A |

Comparative Example 3

The following liquid crystal composition LC-6 not containing the compound represented by Formula (2.1) or (2.2) was prepared.

Chem. 54

| Chemical structure | Ratio (%) | Abbreviation |
| --- | --- | --- |
| (structure) | 2 | 3-Cy-Cy-1d1 |
| (structure) | 15 | 3-Cy-Cy-1d0 |
| (structure) | 15 | 0d1-Cy-Cy-Ph-2 |

-continued
| Chemical structure | Ratio (%) | Abbreviation |
|---|---|---|
| 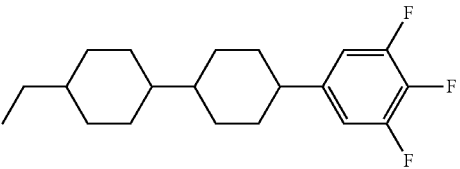 | 8 | 2-Cy-Cy-Ph3-F |
| 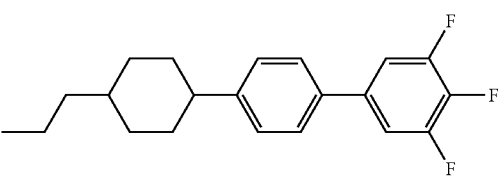 [SMILES: CCCC1CCC(c2ccc(-c3cc(F)c(F)c(F)c3)cc2)CC1] | 9 | 3-Cy-Ph-Ph3-F |
| 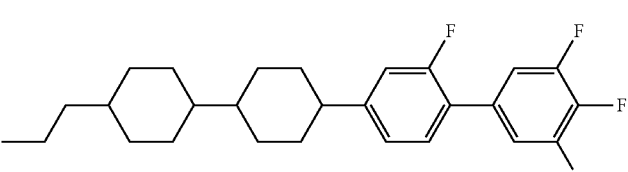 | 3 | 3-Cy-Cy-Ph2-Ph3-F |
| 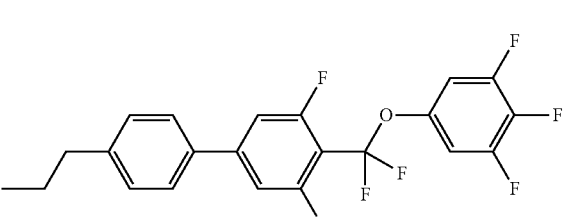 | 11 | 3-Ph-Ph3-CFFO-Ph3-F |
| 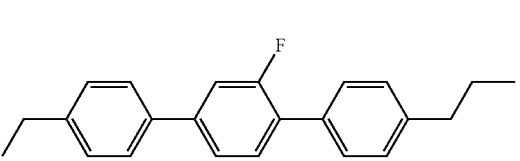 [SMILES: CCCc1ccc(-c2ccc(-c3ccc(CC)cc3)cc2F)cc1] | 3 | 2-Ph-Ph2-Ph-3 |
| 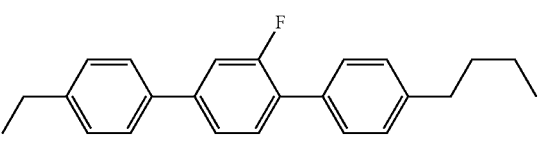 | 3 | 2-Ph-Ph2-Ph-4 |
| 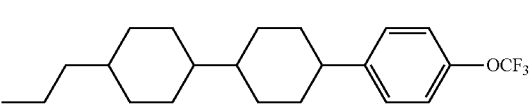 [SMILES: CCCC1CCC(C2CCC(c3ccc(OC(F)(F)F)cc3)CC2)CC1] | 14 | 3-Cy-Cy-Ph-OCFFF |
| 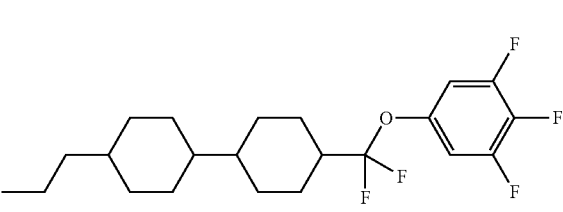 [SMILES: CCCC1CCC(C2CCC(C(F)(F)Oc3cc(F)c(F)c(F)c3)CC2)CC1] | 17 | 3-Cy-Cy-CFFO-Ph3-F |

The LC-6 had the following physical properties.

TABLE 12

| Transition point | 90.0 |
|---|---|
| Birefringence | 0.098 |
| Dielectric anisotropy | 8.9 |
| Viscosity | 19 |
| Rotational viscosity | 88 |

As compared with the liquid crystal composition LC-5 containing the compound represented by Formula (2.1), the liquid crystal composition LC-6 not containing the compound represented by Formula (2.1) or (2.2) had a larger rotational viscosity. The initial VHR of the liquid crystal composition LC-6 was 99.5%, and the VHR of the liquid crystal composition LC-6 which had been left to stand at a high temperature of 150° C. for an hour was 98.5%. The resolvability at low temperature was evaluated; in the evaluation, precipitation was observed earlier than the LC-5 as shown in Table 13.

The liquid crystal composition LC-6 was used to manufacture a TN liquid crystal display device, and screen burn-in, stains of liquid crystal droplets, and process compatibility were evaluated in the manner described above. Results of the evaluations were inferior to those in Example 3 as shown in Table 13.

TABLE 13

| Screen burn-in | C |
|---|---|
| Stains of liquid crystal droplets | D |
| Process compatibility | C |
| Resolvability at low temperature | D |

Example 4

The following liquid crystal composition LC-7 was prepared, and the physical properties thereof were measured. Results of the measurement are shown in the following table.

Chem. 55

| Chemical structure | Ratio (%) | Abbreviation |
|---|---|---|
| 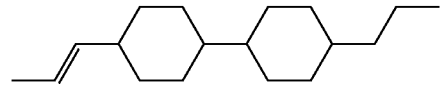 | 2 | 3-Cy-Cy-1d1 |
| 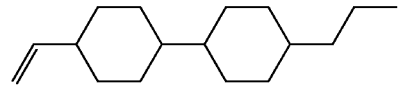 [SMILES: C=CC1CCC(C2CCC(CCC)CC2)CC1] | 15 | 3-Cy-Cy-1d0 |
| 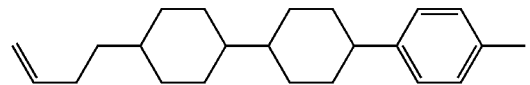 | 15 | 0d3-Cy-Cy-Ph-1 |
| 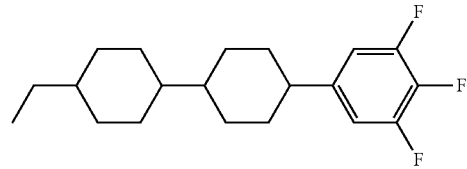 | 8 | 2-Cy-Cy-Ph3-F |
| 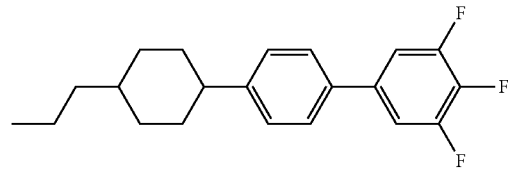 [SMILES: CCCC1CCC(c2ccc(-c3cc(F)c(F)c(F)c3)cc2)CC1] | 9 | 3-Cy-Ph-Ph3-F |
| 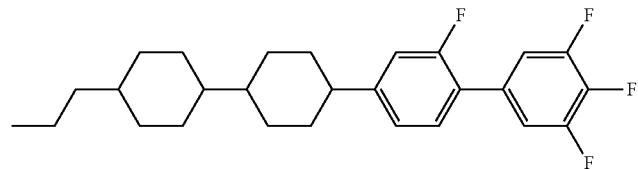 [SMILES: CCCC1CCC(C2CCC(c3ccc(-c4cc(F)c(F)c(F)c4)c(F)c3)CC2)CC1] | 3 | 3-Cy-Cy-Ph2-Ph3-F |
| 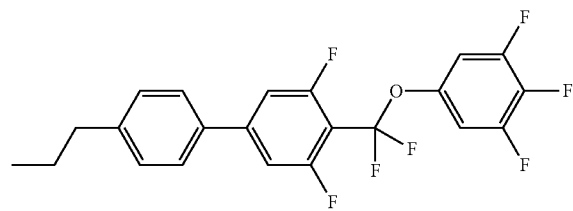 [SMILES: CCCc1ccc(-c2cc(F)c(C(F)(F)Oc3cc(F)c(F)c(F)c3)c(F)c2)cc1] | 11 | 3-Ph-Ph3-CFFO-Ph3-F |

-continued

Chem. 55

| Chemical structure | Ratio (%) | Abbreviation |
|---|---|---|
| | 3 | 2-Ph-Ph2-Ph-3 |
| | 3 | 2-Ph-Ph2-Ph-4 |
| | 14 | 3-Cy-Cy-Ph-OCFFF |
| | 17 | 3-Cy-Cy-CFFO-Ph3-F |

The LC-7 had the following physical properties.

TABLE 14

| Transition point | 93.2 |
| Birefringence | 0.099 |
| Dielectric anisotropy | 9.1 |
| Viscosity | 16 |
| Rotational viscosity | 85 |

The initial VHR of the liquid crystal composition LC-7 was 99.5%, and the VHR of the liquid crystal composition LC-7 which had been left to stand at a high temperature of 150° C. for an hour was 98.6%. The resolvability at low temperature was evaluated, and excellent result of the evaluation was exhibited as shown in Table 14. The liquid crystal composition LC-7 was used to manufacture a TN liquid crystal display device through an ODF process, and screen burn-in, stains of liquid crystal droplets, and process compatibility were evaluated in the manner described above. Excellent results of the evaluations were exhibited as shown in Table 14.

TABLE 14

| Screen burn-in | A |
| Stains of liquid crystal droplets | A |
| Process compatibility | A |
| Resolvability at low temperature | A |

Comparative Example 4

The following liquid crystal composition LC-8 not containing the compound represented by Formula (2.1) or (2.2) was prepared.

Chem. 57

| Chemical structure | Ratio (%) | Abbreviation |
|---|---|---|
| | 2 | 3-Cy-Cy-1d1 |
| | 15 | 3-Cy-Cy-1d0 |

-continued
Chem. 57
| Chemical structure | Ratio (%) | Abbreviation |
|---|---|---|
|  | 15 | 0d3-Cy-Cy-Ph-2 |
| 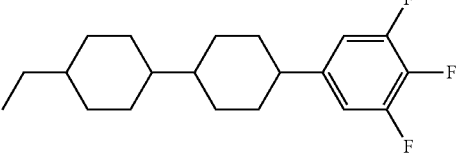 | 8 | 2-Cy-Cy-Ph3-F |
| 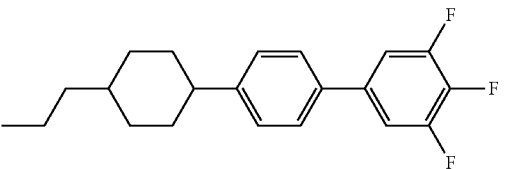 | 9 | 3-Cy-Ph-Ph3-F |
| 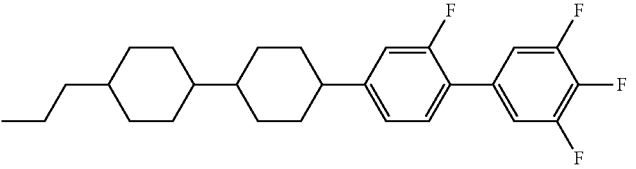 [SMILES: CCCC1CCC(C2CCC(c3ccc(-c4cc(F)c(F)c(F)c4)c(F)c3)CC2)CC1] | 3 | 3-Cy-Cy-Ph2-Ph3-F |
| 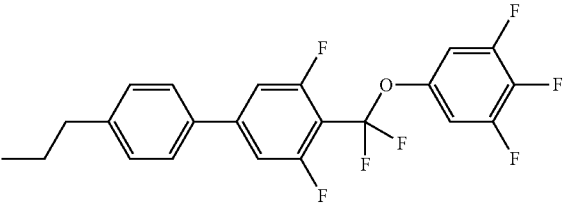 [SMILES: CCCc1ccc(-c2cc(F)c(C(F)(F)Oc3cc(F)c(F)c(F)c3)c(F)c2)cc1] | 11 | 3-Ph-Ph3-CFFO-Ph3-F |
| 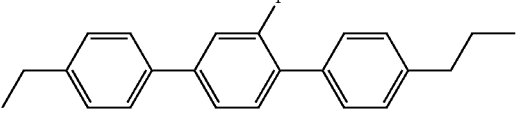 | 3 | 2-Ph-Ph2-Ph-3 |
| 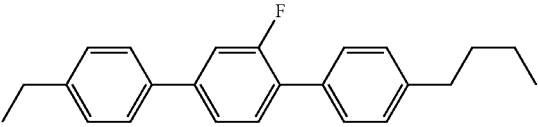 [SMILES: CCCCc1ccc(-c2ccc(-c3ccc(CC)cc3)cc2F)cc1] | 3 | 2-Ph-Ph2-Ph-4 |
| 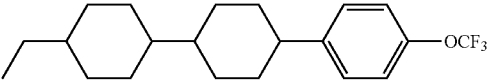 [SMILES: CCC1CCC(C2CCC(c3ccc(OC(F)(F)F)cc3)CC2)CC1] | 14 | 3-Cy-Cy-Ph-OCFFF |

Chem. 57

| Chemical structure | Ratio (%) | Abbreviation |
|---|---|---|
| | 17 | 3-Cy-Cy-CFFO-Ph3-F |

The LC-8 had the following physical properties.

TABLE 15

| | |
|---|---|
| Transition point | 92.6 |
| Birefringence | 0.098 |
| Dielectric anisotropy | 8.9 |
| Viscosity | 19 |
| Rotational viscosity | 92 |

As compared with the liquid crystal composition LC-7 containing the compound represented by Formula (2.2), the liquid crystal composition LC-8 not containing the compound represented by Formula (2.1) or (2.2) had a larger rotational viscosity. The initial VHR of the liquid crystal composition LC-8 was 99.0%, and the VHR of the liquid crystal composition LC-8 which had been left to stand at a high temperature of 150° C. for an hour was 98.1%. The resolvability at low temperature was evaluated; in the evaluation, precipitation was observed earlier than the LC-7 as shown in Table 16.

The liquid crystal composition LC-8 was used to manufacture a TN liquid crystal display device, and screen burn-in, stains of liquid crystal droplets, and process compatibility were evaluated in the manner described above. Results of the evaluations were inferior to those in Example 4 as shown in Table 16.

TABLE 16

| | |
|---|---|
| Screen burn-in | C |
| Stains of liquid crystal droplets | D |
| Process compatibility | D |
| Resolvability at low temperature | C |

Examples 7 to 10

The following liquid crystal compositions LC-9 to LC-12 were prepared, and the physical properties thereof were measured. Results of the measurement are shown in Tables 17 and 18.

TABLE 17

| LC-9 | | LC-10 | |
|---|---|---|---|
| Chemical structure | Ratio (%) | Chemical structure | Ratio (%) |
| 4-Cy—Cy-1d0 | 22 | 3-Cy—Cy-1d1 | 5 |
| 5-Cy—Cy-1d0 | 6 | 5-Cy—Cy-1d0 | 21 |
| 0d1-Cy—Cy—Ph-1 | 8 | 5-Cy—Ph—O2 | 5 |
| 3-Cy—Cy—VO—Ph—Cy-3 | 4 | 0d1-Cy—Cy—Ph-1 | 14 |
| 3-Ph—Ph3-CFFO—Ph3-F | 15 | 3-Cy—Cy—VO—Ph—Cy-3 | 3 |
| 3-Cy—Cy—CFFO—Ph3-F | 7 | 3-Cy—Cy—VO—Ph—Cy-4 | 3 |
| 5-Cy—Cy—CFFO—Ph3-F | 8 | 3-Cy—Cy—VO—Ph—Cy-5 | 3 |
| 3-Ph—Ph2-Ph3-CFFO—Ph3-F | 7 | 2-Cy—Ph—Ph3-F | 5 |
| 2-Py—Ph—Ph3-CFFO—Ph3-F | 7 | 3-Cy—Ph—Ph3-F | 5 |
| 3-Py—Ph—Ph3-CFFO—Ph3-F | 8 | 3-Cy—Cy—CFFO—Ph3-F | 17 |
| 3-Cy—Ph—Ph3-Ph2-OCFFF | 6 | 2-Cy—Cy—CFFO—Ph3-F | 6 |
| 3-Ph—Ph—Ph2-Ph3-f | 2 | 3-Ph—Ph3-CFFO—Ph3-F | 7 |
| Transition point | 94.8 | 2-Ph—Ph3-CFFO—Ph3-F | 6 |
| Birefringence | 0.121 | Transition point | 100.0 |
| Dielectric anisotropy | 17.1 | Birefringence | 0.095 |
| Rotational viscosity | 190 | Dielectric anisotropy | 6.0 |
| Viscosity | 35 | Rotational viscosity | 95 |
| | | Viscosity | 19 |

TABLE 18

| LC-11 | | LC-12 | |
|---|---|---|---|
| Chemical structure | Ratio (%) | Chemical structure | Ratio (%) |
| 2-Cy—Cy-1d1 | 17 | 3-Cy—Cy-1d0 | 15 |
| 3-Cy—Cy-1d0FF | 27 | 3-Cy—Cy-1d1 | 22 |
| 0d1-Cy—Cy—Ph-1 | 15 | 0d1-Cy—Cy—Ph-1 | 16 |
| 0d3-Cy—Cy—Ph-1 | 2 | 0d3-Cy—Cy—Ph-1 | 14 |
| 2-Ph—Ph2-Ph-3 | 11 | 2-Ph—Ph3-CFFO—Ph3-F | 7 |
| 2-Ph—Ph2-Ph-5 | 13 | 3-Ph—Ph3-CFFO—Ph3-F | 7 |
| 5-Cy—Ph—Ph2-Ph-2 | 2 | 3-Cy—Cy—CFFO—Ph3-F | 7 |
| 3-Ph—Ph3-CFFO—Ph3-F | 7 | 3-Ph—Ph2-Ph3-CFFO—Ph3-F | 2 |
| 3-Cy—Cy—CFFO—Ph3-F | 6 | 2-Py—Ph—Ph3-CFFO—Ph3-F | 5 |
| Transition point | 77.0 | 3-Py—Ph—Ph3-CFFO—Ph3-F | 4 |
| Birefringence | 0.115 | 3-Ph—Ph—Ph2-Ph3-F | 1 |
| Dielectric anisotropy | 4.0 | Transition point | 95.3 |
| Rotational viscosity | 48 | Birefringence | 0.109 |
| Viscosity | 12 | Dielectric anisotropy | 6.8 |
| | | Rotational viscosity | 64 |
| | | Viscosity | 17 |

The liquid crystal compositions LC-9 to LC-12 exhibited good resistance to resolution at low temperature. Although the VHR of each of the liquid crystal compositions LC-9 to LC-12 which had been left to stand at a high temperature of 150° C. for an hour slightly varied from the initial VHR, the variation was acceptable. Each of the liquid crystal compositions LC-9 to LC-12 was used to manufacture a TN liquid crystal display device, and screen burn-in, stains of liquid crystal droplets, and process compatibility were evaluated. Excellent results of the evaluations were exhibited as shown in Table 19.

TABLE 19

| | LC-9 | LC-10 | LC-11 | LC-12 |
|---|---|---|---|---|
| Initial voltage holding ratio (%) | 98.1 | 99.2 | 99.5 | 99.3 |
| Voltage holding ratio after an hour at 150° C. (%) | 95.1 | 98.1 | 98.5 | 98.0 |
| Screen burn-in | A | A | A | A |
| Stains of liquid crystal droplets | A | A | A | A |
| Process compatibility | A | A | A | A |
| Resolvability at low temperature | A | A | A | A |

Examples 11 to 14

The following liquid crystal compositions LC-13 to LC-16 were prepared, and the physical properties thereof were measured. Results of the measurement are shown in Tables 20 and 21.

TABLE 20

| LC-13 | | LC-14 | |
|---|---|---|---|
| Chemical structure | Ratio (%) | Chemical structure | Ratio (%) |
| 3-Cy—Cy-1d0 | 17 | 5-Cy—Cy-1d0 | 8 |
| 0d1-Cy—Cy—Ph-1 | 8 | 3-Cy—Cy-1d1 | 7 |
| 2-Ph—Ph2-Ph-3 | 6 | 0d1-Cy—Cy—Ph-1 | 10 |
| 2-Ph—Ph2-Ph-4 | 4 | 5-Cy—Cy—Ph—O1 | 6 |
| 2-Cy—Cy—Ph3-F | 8 | 2-Ph—Ph2-Ph-3 | 6 |
| 3-Cy—Ph—Ph3-F | 9 | 3-Cy—Cy—CFFO—Ph3-F | 7 |
| 3-Cy—Cy—Ph—OCFFF | 14 | 5-Cy—Cy—CFFO—Ph3-F | 4 |
| 3-Ph—Ph3-CFFO—Ph3-F | 11 | 3-Cy—Ph—Ph2-F | 6 |
| 3-Cy—Cy—CFFO—Ph3-F | 9 | 3-Cy—Ph—Ph3-F | 9 |
| 5-Cy—Cy—CFFO—Ph3-F | 8 | 2-Cy—Cy—Ph3-F | 11 |
| 3-Cy—Cy—Ph2-Ph3-F | 3 | 3-Cy—Cy—Ph3-F | 15 |
| 3-Cy—Ph—Ph3-Ph2-OCFFF | 3 | 5-Cy—Cy—Ph3-F | 5 |
| Transition point | 89.5 | 4-Cy—Cy—Phx—OCFFF | 4 |
| Birefringence | 0.104 | 3-Cy—Cy—Ph2-Ph3-F | 2 |
| Dielectric anisotropy | 9.1 | Transition point | 101.4 |
| Rotational viscosity | 77 | Birefringence | 0.097 |
| Viscosity | 17 | Dielectric anisotropy | 7.15 |
| | | Rotational viscosity | 104 |
| | | Viscosity | 21.1 |

TABLE 21

| LC-15 | | LC-16 | |
|---|---|---|---|
| Chemical structure | Ratio (%) | Chemical structure | Ratio (%) |
| 3-Cy—Cy-1d1 | 2 | 3-Cy—Cy-1d0 | 16 |
| 5-Cy—Cy-1d0 | 15 | 0d1-Cy—Cy—Ph-1 | 15 |
| 0d1-Cy—Cy—Ph-1 | 8 | 3-Cy—Cy-1d0FF | 28 |
| 2-Ph—Ph2-Ph-3 | 6 | 2-Ph—Ph2-Ph-3 | 11 |
| 2-Ph—Ph2-Ph-4 | 4 | 2-Ph—Ph2-Ph-5 | 15 |
| 2-Cy—Cy—Ph3-F | 8 | 5-Cy—Ph—Ph2-Ph-2 | 2 |
| 3-Cy—Ph—Ph3-F | 9 | 3-Ph—Ph3-CFFO—Ph3-F | 7 |
| 3-Cy—Cr—Ph—OCFFF | 14 | 3-Cy—Cy—CFFO—Ph3-F | 6 |
| 3-Ph—Ph3-CFFO—Ph3-F | 11 | Transition point | 76.0 |
| 3-Cy—Cy—CFFO—Ph3-F | 9 | Birefringence | 0.117 |
| 5-Cy—Cy—CFFO—Ph3-F | 8 | Dielectric anisotropy | 3.9 |
| 4-Cy—Cy—Ph2-CFFO—Ph3-F | 3 | Rotational viscosity | 44 |
| 3-Cy—Cy—Ph2-Ph3-F | 3 | Viscosity | 11 |
| Transition point | 92.6 | | |
| Birefringence | 0.106 | | |
| Dielectric anisotropy | 9.1 | | |
| Rotational viscosity | 86 | | |
| Viscosity | 18 | | |

The liquid crystal compositions LC-13 to LC-16 exhibited good resistance to resolution at low temperature. Although the VHR of each of the liquid crystal compositions LC-13 to LC-16 which had been left to stand at a high temperature of 150° C. for an hour slightly varied from the initial VHR, the variation was acceptable. Each of the liquid crystal compositions LC-13 to LC-16 was used to manufacture a TN liquid crystal display device, and screen burn-in, stains of liquid crystal droplets, and process compatibility were evaluated. Excellent results of the evaluations were exhibited as shown in Table 22.

TABLE 22

| | LC-13 | LC-14 | LC-15 | LC-16 |
|---|---|---|---|---|
| Initial voltage holding ratio (%) | 98.5 | 98.5 | 98.1 | 99.5 |
| Voltage holding ratio after an hour at 150° C. (%) | 97.3 | 98.0 | 96.9 | 98.7 |
| Screen burn-in | A | A | A | A |
| Stains of liquid crystal droplets | A | A | A | A |
| Process compatibility | A | A | A | A |
| Resolvability at low temperature | A | A | A | A |

Examples 15 to 18

The following liquid crystal compositions LC-17 to LC-20 were prepared, and the physical properties thereof were measured. Results of the measurement are shown in Tables 23 and 24.

TABLE 23

| LC-17 | | LC-18 | |
|---|---|---|---|
| Chemical structure | Ratio (%) | Chemical structure | Ratio (%) |
| 3-Cy—Cy-1d1 | 16 | 3-Cy—Cy-1d0 | 25 |
| 3-Cy—Cy-1d0FF | 27 | 5-Cy—Cy-1d0 | 12 |
| 0d1-Cy—Cy—Ph-1 | 6 | 3-Cy—Cy-1d1 | 12 |
| 0d3-Cy—Cy—Ph-1 | 6 | 0d1-Cy—Cy—Ph-1 | 4 |
| 2-Ph—Ph2-Ph-3 | 12 | 0d3-Cy—Cy—Ph-1 | 9 |
| 2-Ph—Ph2-Ph-5 | 12 | 3-Ph—Ph2-Ph-3-F | 9 |
| 5-Cy—Ph—Ph2-Ph-2 | 8 | 2-Ph—Ph2-Ph3-F | 5 |
| 3-Ph—Ph3-CFFO—Ph3-F | 7 | 2-Ph—Ph3-CFFO—Ph3-F | 4 |
| 3-Cy—Cy—CFFO—Ph3-F | 6 | 3-Ph—Ph3-CFFO—Ph3-F | 6 |
| Transition point | 90 | 3-Cy—Cy—CFFO—Ph3-F | 2 |
| Birefringence | 0.126 | 5-Cy—Cy—CFFO—Ph3-F | 3 |
| Dielectric anisotropy | 3.3 | 3-Cy—Cy—Ph2-Ph3-F | 9 |
| Rotation viscosity | 54 | Transition point | 77.4 |
| Viscosity | 11 | Birefringence | 0.101 |
| | | Dielectric anisotropy | 7.0 |
| | | Rotational viscosity | 52 |
| | | Viscosity | 12 |

TABLE 24

| | LC-19 | | LC-20 |
|---|---|---|---|
| Chemical structure | Ratio (%) | Chemical structure | Ratio (%) |
| 3-Cy-Cy-1d0 | 19 | 3-Cy-Cy-1d0 | 35 |
| 3-Cy-Cy-1d1 | 7 | 3-Cy-Cy-1d1 | 14 |
| 5-Cy-Ph-O2 | 5 | 1-Ph-Ph-3d1 | 12 |
| 0d1-Cy-Cy-Ph-1 | 14 | 0d3-Cy-Cy-Ph-1 | 4 |
| 3-Cy-Cy-VO-Ph-Cy-3 | 3 | 2-Ph-Ph2-Ph-3 | 8 |
| 3-Cy-Cy-VO-Ph-Cy-4 | 3 | 2-Ph-Ph2-Ph-5 | 9 |
| 3-Cy-Cy-VO-Ph-Cy-5 | 3 | 3-Ph-Ph2-Ph3-CFFO-Ph3-F | 5 |
| 2-Cy-Ph-Ph3-F | 11 | 3-Cy-Cy-CFFO-Ph3-F | 5 |
| 3-Cy-Ph-Ph3-F | 11 | 3-Cy-Cy-Ph3-F | 4 |
| 3-Cy-Cy-CFFO-Ph3-F | 17 | 3-Cy-Ph-Ph3-Ph2-OCFFF | 4 |
| 3-Ph-Ph3-CFFO-Ph3-F | 7 | Transition point | 84.1 |
| Transition point | 99.0 | Birefringence | 0.122 |
| Birefringence | 0.097 | Dielectric anisotropy | 3.6 |

TABLE 24-continued

| Chemical structure | LC-19 Ratio (%) | Chemical structure | LC-20 Ratio (%) |
|---|---|---|---|
| Dielectric anisotropy | 5.7 | Rotational viscosity | 42 |
| Rotational viscosity | 80 | Viscosity | 11 |
| Viscosity | 18 | | |

The liquid crystal compositions LC-17 to LC-20 exhibited good resistance to resolution at low temperature. Although the VHR of each of the liquid crystal compositions LC-17 to LC-20 which had been left to stand at a high temperature of 150° C. for an hour slightly varied from the initial VHR. Each of the liquid crystal compositions LC-17 to LC-20 was used to manufacture a TN liquid crystal display device, and screen burn-in, stains of liquid crystal droplets, and process compatibility were evaluated. Excellent results of the evaluations were exhibited as shown in Table 25.

TABLE 25

| | LC-17 | LC-18 | LC-19 | LC-20 |
|---|---|---|---|---|
| Initial voltage holding ratio (%) | 99.6 | 99.1 | 99.4 | 99.7 |
| Voltage holding ratio after an hour at 150° C. (%) | 99.0 | 98.0 | 98.2 | 99.1 |
| Screen burn-in | A | A | A | A |
| Stains of liquid crystal droplets | A | A | A | A |
| Process compatibility | A | A | A | A |
| Resolvability at low temperature | A | A | A | A |

Examples 19 to 22

The following liquid crystal compositions LC-21 to LC-24 were prepared, and the physical properties thereof were measured. Results of the measurement are shown in Tables 26 and 27.

TABLE 26

| Chemical structure | LC-21 Ratio (%) | Chemical structure | LC-22 Ratio (%) |
|---|---|---|---|
| 5-Cy-Cy-1d0 | 5 | 4-Cy-Cy-1d0 | 21 |
| 3-Cy-Cy-1d1 | 10 | 3-Cy-Cy-1d1 | 5 |
| 0d1-Cy-Cy-Ph-1 | 10 | 0d1-Cy-Cy-Ph-1 | 14 |

TABLE 26-continued

| Chemical structure | LC-21 Ratio (%) | Chemical structure | LC-22 Ratio (%) |
|---|---|---|---|
| 5-Cy-Cy-Ph-O1 | 6 | 5-Cy-Ph-O2 | 5 |
| 2-Ph-Ph2-Ph-3 | 6 | 2-Cy-Ph-Ph3-F | 5 |
| 3-Cy-Cy-CFFO-Ph3-F | 6 | 3-Cy-Ph-Ph3-F | 5 |
| 5-Cy-Cy-CFFO-Ph3-F | 5 | 2-Cy-Cy-CFFO-Ph3-F | 9 |
| 3-Cy-Ph-Ph2-F | 7 | 3-Cy-Cy-CFFO-Ph3-F | 14 |
| 3-Cy-Ph-Ph3-F | 8 | 2-Ph-Ph3-CFFO-Ph3-F | 6 |
| 2-Cy-Cy-Ph3-F | 13 | 3-Ph-Ph3-CFFO-Ph3-F | 7 |
| 3-Cy-Cy-Ph3-F | 13 | 3-Cy-Cy-VO-Ph-Cy-3 | 3 |
| 5-Cy-Cy-Ph3-F | 5 | 3-Cy-Cy-VO-Ph-Cy-4 | 3 |
| 4-Cy-Cy-Ph-OCFFF | 4 | 3-Cy-Cy-VO-Ph-Cy-5 | 3 |
| 3-Cy-Cy-Ph2-Ph3-F | 2 | Transition point | 94 |
| Transition point | 102.5 | Birefringence | 0.095 |
| Birefringence | 0.098 | Dielectric anisotropy | 5.2 |
| Dielectric anisotropy | 7.1 | Rotational viscosity | 100 |
| Rotational viscosity | 104 | Viscosity | 20 |
| Viscosity | 20.8 | | |

TABLE 27

| Chemical structure | LC-23 Ratio (%) | Chemical structure | LC-24 Ratio (%) |
|---|---|---|---|
| 3-Cy-Cy-1d0 | 15 | 3-Cy-Cy-1d0 | 22 |
| 5-Cy-Cy-1d0 | 22 | 3-Cy-Cy-1d1 | 6 |
| 3-Cy-Cy-1d1 | 8 | 2-Ph-Ph2-Ph-3 | 8 |
| 0d3-Cy-Cy-Ph-1 | 8 | 3-Cy-Cy-VO-Ph-Cy-3 | 4 |
| 5-Cy-Ph-Ph-2 | 4 | 3-Cy-Cy-CFFO-Ph3-F | 7 |
| 2-Ph-Ph2-Ph-5 | 4 | 5-Cy-Cy-CFFO-Ph3-F | 8 |
| 3-Ph-Ph3-CFFO-Ph3-F | 8 | 3-Ph-Ph2-Ph3-CFFO-Ph3-F | 7 |
| 3-Cy-Cy-CFFO-Ph3-F | 15 | 2-Ph-Ph3-CFFO-Ph3-F | 15 |
| 3-Ph-Ph2-Ph3-CFFO-Ph3-F | 2 | 2-Py-Ph-Ph3-CFFO-Ph3-F | 7 |
| 4-Ph-Ph2-Ph3-CFFO-Ph3-F | 7 | 3-Py-Ph-Ph3-CFFO-Ph3-F | 8 |
| 5-Ph-Ph2-Ph3-CFFO-Ph3-F | 7 | 3-Cy-Ph-Ph3-Ph2-OCFFF | 6 |
| Transition point | 92.8 | 3-Ph-Ph-Ph2-Ph3-F | 2 |
| Birefringence | 0.114 | Transition point | 97.6 |
| Dielectric anisotropy | 8.1 | Birefringence | 0.134 |
| Rotational viscosity | 67 | Dielectric anisotropy | 18.9 |
| Viscosity | 18 | Rotational viscosity | 174 |
| | | Viscosity | 29.6 |

The liquid crystal compositions LC-21 to LC-24 exhibited good resistance to resolution at low temperature. Although the VHR of each of the liquid crystal compositions LC-21 to LC-24 which had been left to stand at a high temperature of 150° C. for an hour slightly varied from the initial VHR, the variation was acceptable. Each of the liquid crystal compositions LC-21 to LC-24 was used to manufacture a TN liquid crystal display device, and screen burn-in, stains of liquid crystal droplets, and process compatibility were evaluated. Excellent results of the evaluations were exhibited as shown in Table 28.

TABLE 28

| | LC-21 | LC-22 | LC-23 | LC-24 |
|---|---|---|---|---|
| Initial voltage holding ratio (%) | 99.0 | 99.3 | 99.2 | 97.9 |
| Voltage holding ratio after an hour at 150° C. (%) | 98.0 | 98.3 | 98.0 | 95.8 |
| Screen burn-in | A | A | A | A |
| Stains of liquid crystal droplets | A | A | A | A |
| Process compatibility | A | A | A | A |
| Resolvability at low temperature | A | A | A | A |

Examples 23 to 26

The following liquid crystal compositions LC-25 to LC-28 were prepared, and the physical properties thereof were measured. Results of the measurement are shown in Tables 29 and 30.

TABLE 29

| | LC-25 | | LC-26 |
|---|---|---|---|
| Chemical structure | Ratio (%) | Chemical structure | Ratio (%) |
| 3-Cy-Cy-1d0 | 48 | 3-Cy-Cy-1d0 | 14 |
| 3-Cy-Cy-1d1 | 4 | 3-Cy-Cy-1d1 | 3 |
| 1-Ph-Ph-3d1 | 8 | 0d1-Cy-Cy-Ph-1 | 4 |
| 0d1-Cy-Cy-Ph-1 | 7 | 2-Ph-Ph2-Ph-3 | 8 |
| 3-Ph-Ph2-Ph-3 | 7 | 2-Ph-Ph2-Ph-4 | 6 |
| 3-Ph-Ph2-Ph-5 | 8 | 2-Cy-Cy-Ph3-F | 8 |
| 3-Cy-Cy-CFFO-Ph3-F | 4 | 3-Cy-Ph-Ph3-F | 9 |
| 3-Ph-Ph2-Ph3-CFFO-Ph3-F | 5 | 3-Cy-Cy-Ph-OCFFF | 14 |
| 4-Cy-Cy-Ph2-CFFO-Ph3-F | 3 | 3-Ph-Ph3-CFFO-Ph3-F | 11 |
| 3-Cy-Ph-Ph3-Ph2-OCFFF | 6 | 3-Cy-Cy-CFFO-Ph3-F | 10 |
| Transition point | 81.2 | 5-Cy-Cy-CFFO-Ph3-F | 7 |
| Birefringence | 0.109 | 3-Cy-Cy-Ph2-Ph3-F | 3 |
| Dielectric anisotropy | 4.7 | 3-Cy-Cy-Ph2-Cy-3 | 3 |
| Rotational viscosity | 45 | Transition point | 90.5 |
| Viscosity | 13 | Birefringence | 0.111 |
| | | Dielectric anisotropy | 9.0 |
| | | Rotational viscosity | 82 |
| | | Viscosity | 17 |

TABLE 30

| | LC-27 | | LC-28 |
|---|---|---|---|
| Chemical structure | Ratio (%) | Chemical structure | Ratio (%) |
| 3-Cy-Cy-1d0 | 42 | 3-Cy-Cy-1d0 | 11 |
| 3-Cy-Cy-1d1 | 10 | 3-Cy-Cy-1d1 | 4 |
| 0d1-Cy-Cy-Ph-1 | 2 | 0d1-Cy-Cy-Ph-1 | 3 |
| 0d3-Cy-Cy-Ph-1 | 10 | 0d3-Cy-Cy-Ph-1 | 4 |
| 3-Cy-Ph-Ph-2 | 3 | 2-Ph-Ph2-Ph-5 | 6 |
| 2-Ph-Ph2-Ph-3 | 4 | 3-Cy-Ph-Ph-Cy-3 | 4 |
| 3-Cy-Ph-Ph-Cy-3 | 4 | 3-Cy-Ph-Ph2-Cy-3 | 3 |
| 3-Ph-Ph3-CFFO-Ph3-F | 3 | 0d1-Cy-Cy-Ph2-F | 8 |
| 3-Cy-Cy-CFFO-Ph3-F | 3 | 3-Ph-Ph3-CFFO-Ph3-F | 4 |
| 3-Cy-Cy-Ph2-Ph3-F | 3 | 3-Cy-Cy-CFFO-Ph3-F | 6 |
| 3-Cy-Ph-Cl | 3 | 1-Cy-Cy-Ph3-F | 6 |
| 3-Ph-Ph2-Ph3-F | 6 | 2-Cy-Cy-Ph3-F | 13 |
| 2-Ph-Ph3-Ph3-F | 7 | 3-Cy-Cy-Ph3-F | 13 |
| Transition point | 76.9 | 5-Cy-Cy-Ph3-F | 7 |
| Birefringence | 0.096 | 3-Cy-Cy-Ph2-Ph3-F | 8 |
| Dielectric anisotropy | 4.2 | Transition point | 108.2 |
| Rotational viscosity | 37 | Birefringence | 0.096 |
| Viscosity | 9 | Dielectric anisotropy | 8.6 |
| | | Rotational viscosity | 90 |
| | | Viscosity | 22 |

The liquid crystal compositions LC-25 to LC-28 exhibited good resistance to resolution at low temperature. The VHR of each of the liquid crystal compositions LC-25 to LC-28 which had been left to stand at a high temperature of 150° C. for an hour substantially did not varied from the initial VHR. Each of the liquid crystal compositions LC-25 to LC-28 was used to manufacture a TN liquid crystal display device, and screen burn-in, stains of liquid crystal droplets, and process compatibility were evaluated. Excellent results of the evaluations were exhibited as shown in Table 31.

TABLE 31

| | LC-25 | LC-26 | LC-27 | LC-28 |
|---|---|---|---|---|
| Initial voltage holding ratio (%) | 99.2 | 98.9 | 99.5 | 99.0 |
| Voltage holding ratio after an hour at 150° C. (%) | 98.3 | 97.6 | 98.8 | 98.2 |
| Screen burn-in | A | A | A | A |
| Stains of liquid crystal droplets | A | A | A | A |
| Process compatibility | A | A | A | A |
| Resolvability at low temperature | A | A | A | A |

Examples 27 to 30

The following liquid crystal compositions LC-29 to LC-32 were prepared, and the physical properties thereof were measured. Results of the measurement are shown in Tables 32 and 33.

TABLE 32

| | LC-29 | | LC-30 |
|---|---|---|---|
| Chemical structure | Ratio (%) | Chemical structure | Ratio (%) |
| 3-Cy-Cy-1d0 | 11 | 3-Cy-Cy-1d0 | 35 |
| 3-Cy-Cy-1d1 | 4 | 3-Cy-Cy-1d1 | 16 |
| 0d1-Cy-Cy-Ph-1 | 3 | 0d1-Cy-Cy-Ph-1 | 10 |
| 0d3-Cy-Cy-Ph-1 | 4 | 2-Ph-Ph2-Ph-3 | 10 |
| 2-Ph-Ph2-Ph-3 | 7 | 2-Ph-Ph2-Ph-5 | 10 |
| 2-Ph-Ph2-Ph-5 | 6 | 3-Ph-Ph3-CFFO-Ph3-F | 4 |
| 0d1-Cy-Cy-Ph2-F | 8 | 4-Ph-Ph2-Ph3-CFFO-Ph3-F | 4 |
| 3-Ph-Ph3-CFFO-Ph3-F | 4 | 3-Cy-Cy-CFFO-Ph3-F | 5 |
| 3-Cy-Cy-CFFO-Ph3-F | 6 | 3-Cy-Cy-Ph-Ph3-F | 6 |
| 1-Cy-Cy-Ph3-F | 10 | Transition point | 86.8 |
| 2-Cy-Cy-Ph3-F | 10 | Birefringence | 0.109 |
| 3-Cy-Cy-Ph3-F | 10 | Dielectric anisotropy | 3.9 |
| 5-Cy-Cy-Ph3-F | 9 | Rotational viscosity | 44 |
| 3-Cy-Cy-Ph2-Ph3-F | 8 | Viscosity | 11 |
| Transition point | 99.9 | | |
| Birefringence | 0.104 | | |
| Dielectric anisotropy | 8.8 | | |
| Rotational viscosity | 85 | | |
| Viscosity | 21 | | |

TABLE 33

| | LC-31 | | LC-32 |
|---|---|---|---|
| Chemical structure | Ratio (%) | Chemical structure | Ratio (%) |
| 3-Cy-Cy-1d0 | 35 | 3-Cy-Cy-1d0 | 34 |
| 3-Cy-Cy-1d1 | 14 | 3-Cy-Cy-1d1 | 15 |
| 0d1-Cy-Cy-Ph-1 | 5 | 1-Ph-Ph-3d1 | 12 |
| 0d3-Cy-Cy-Ph-1 | 4 | 0d3-Cy-Cy-Ph-1 | 9 |
| 2-Ph-Ph2-Ph-3 | 7 | 3-Cy-Ph-Ph-2 | 8 |
| 2-Ph-Ph2-Ph-5 | 7 | 3-Cy-Cy-Ph3-F | 8 |
| 3-Ph-Ph3-CFFO-Ph3-F | 6 | 3-Cy-Cy-CFFO-Ph3-F | 5 |
| 3-Cy-Cy-CFFO-Ph3-F | 5 | 4-Cy-Cy-Ph2-CFFO-Ph3-F | 5 |
| 2-Cy-Ph-Ph-F | 2 | 3-Cy-Ph-Ph3-Ph2-OCFFF | 4 |
| 3-Cy-Ph-Ph-F | 6 | Transition point | 83.8 |
| 2-Cy-Cy-Ph2-Ph3-F | 6 | Birefringence | 0.096 |
| 3-Cy-Cy-Ph-Ph3-F | 3 | Dielectric anisotropy | 3.9 |
| Transition point | 82.1 | Rotational viscosity | 38 |
| Birefringence | 0.099 | Viscosity | 12 |
| Dielectric anisotropy | 4.3 | | |
| Rotational viscosity | 47 | | |
| Viscosity | 12 | | |

The liquid crystal compositions LC-29 to LC-32 exhibited good resistance to resolution at low temperature. The VHR of each of the liquid crystal compositions LC-29 to LC-32 which had been left to stand at a high temperature of 150° C. for an hour substantially did not varied from the initial VHR. Each of the liquid crystal compositions LC-29 to LC-32 was used to manufacture a TN liquid crystal display device, and screen burn-in, stains of liquid crystal droplets, and process compatibility were evaluated. Excellent results of the evaluations were exhibited as shown in Table 34.

TABLE 34

|  | LC-29 | LC-30 | LC-31 | LC-32 |
|---|---|---|---|---|
| Initial voltage holding ratio (%) | 98.5 | 99.8 | 99.5 | 99.6 |
| Voltage holding ratio after an hour at 150° C. (%) | 97.9 | 99.3 | 98.9 | 99.2 |
| Screen burn-in | A | A | A | A |
| Stains of liquid crystal droplets | A | A | A | A |
| Process compatibility | A | A | A | A |
| Resolvability at low temperature | A | A | A | A |

Examples 31 to 33

The following liquid crystal compositions LC-33 to LC-35 were prepared, and the physical properties thereof were measured. Results of the measurement are shown in Table 35.

TABLE 35

| Chemical structure | LC-33 Ratio (%) | Chemical structure | LC-34 Ratio (%) |
|---|---|---|---|
| 3-Cy-Cy-1d1 | 7 | 3-Cy-Cy-1d0 | 15 |
| 3-Cy-Cy-1d0 | 19 | 3-Cy-Cy-1d1 | 22 |
| 5-Cy-Ph-O2 | 5 | 0d1-Cy-Cy-Ph-1 | 16 |
| 0d1-Cy-Cy-Ph-1 | 14 | 0d3-Cy-Cy-Ph-1 | 14 |
| 2-Cy-Ph-Ph3-F | 5 | 2-Ph-Ph3-CFFO-Ph3-F | 7 |
| 3-Cy-Ph-Ph3-F | 17 | 3-Ph-Ph3-CFFO-Ph3-F | 7 |
| 3-Ph-Ph3-CFFO-Ph3-F | 7 | 3-Cy-Cy-CFFO-Ph3-F | 7 |
| 3-Cy-Cy-VO-Ph-Cy-3 | 3 | 3-Ph-Ph2-Ph3-CFFO-Ph3-F | 2 |
| 3-Cy-Cy-VO-Ph-Cy-4 | 3 | 3-Py-Ph-Ph3-CFFO-Ph3-F | 9 |
| 3-Cy-Cy-VO-Ph-Cy-5 | 3 | 3-Ph-Ph-Ph2-Ph3-F | 1 |
| 3-Cy-Cy-CFFO-Ph3-F | 17 | Transition point | 96.6 |
| Transition point | 100.0 | Birefringence | 0.110 |
| Birefringence | 0.097 | Dielectric anisotropy | 7.0 |
| Dielectric anisotropy | 5.6 | Rotational viscosity | 66 |
| Viscosity | 18 | Viscosity | 17 |
| Rotational viscosity | 78 |  |  |

| Chemical structure | LC-35 Ratio (%) |
|---|---|
| 3-Cy-Cy-1d0 | 34 |
| 3-Cy-Cy-1d1 | 15 |
| 5-Ph-Ph-1 | 12 |
| 2-Ph-Ph2-Ph-3 | 7 |
| 0d1-Cy-Cy-Ph-1 | 10 |
| 0d1-Cy-Cy-Cy-3 | 8 |
| 3-Ph-Ph2-Ph3-CFFO-Ph3-F | 5 |
| 3-Cy-Cy-CFFO-Ph3-F | 5 |
| 3-Cy-Ph-Ph3-Ph2-OCFFF | 4 |
| Transition point | 80.3 |
| Birefringence | 0.102 |
| Dielectric anisotropy | 4.0 |
| Rotational viscosity | 39 |
| Viscosity | 11 |

The liquid crystal compositions LC-33 to LC-35 exhibited good resistance to resolution at low temperature. The VHR of each of the liquid crystal compositions LC-33 to LC-35 which had been left to stand at a high temperature of 150° C. for an hour substantially did not varied from the initial VHR. Each of the liquid crystal compositions LC-33 to LC-35 was used to manufacture a TN liquid crystal display device, and screen burn-in, stains of liquid crystal droplets, and process compatibility were evaluated. Excellent results of the evaluations were exhibited as shown in Table 36.

TABLE 36

|  | LC-33 | LC-34 | LC-35 |
|---|---|---|---|
| Initial voltage holding ratio (%) | 99.4 | 99.0 | 99.5 |
| Voltage holding ratio after an hour at 150° C. (%) | 99.0 | 98.2 | 99.0 |
| Screen burn-in | A | A | A |
| Stains of liquid crystal droplets | A | A | A |
| Process compatibility | A | A | A |
| Resolvability at low temperature | A | A | A |

Example 35

To 99.7% of the nematic liquid crystal composition LC-1 prepared in Example 1, 0.3% of a polymerizable compound represented by Formula (V-2) was added and uniformly dissolved to prepare a polymerizable liquid crystal composition CLC-1.

[Chem. 58]

The physical properties of the CLC-1 were substantially the same as those of the nematic liquid crystal composition prepared in Example 1. The CLC-1 was injected by a vacuum injection technique into an ITO-provided cell which had a cell gap of 3.5 μm and to which polyimide alignment films used for inducing homogeneous alignment had been applied. The liquid crystal cell was irradiated with ultraviolet light with a high-pressure mercury lamp through a filter used for blocking ultraviolet light having a wavelength of 320 nm or less while a square wave having a frequency of 1 kHz was applied to the cell. The irradiation with ultraviolet light was carried out for 600 seconds such that the irradiation intensity on the surface of the cell was 10 mW/cm², so that the polymerizable compound in the polymerizable liquid crystal composition was polymerized to produce a horizontal alignment-type liquid crystal display device. It was confirmed that the polymerization of the polymerizable compound led to development of alignment control force for the liquid crystal compound.

Example 36

Manufacturing of Active-Matrix Driving Liquid Crystal Display Device (Production of Frontplane)
(Formation of Black Matrix)
A black matrix-forming composition containing the following components was applied to a borosilicate glass substrate used for a liquid crystal display device (OA-10 manufactured by Nippon Electric Glass Co., Ltd.) with a die coater so as to have a thickness of 10 μm in a wet state. The product was dried and then pre-baked at 90° C. for 2 minutes to form a black matrix layer having a thickness of 2 μm.
(Black Matrix-Forming Coating Composition)

| | |
|---|---|
| Benzyl methacrylate/methacrylic acid copolymer (molar ratio = 73/27) | 300 parts |
| Dipentaerythritol hexaacrylate | 160 parts |
| Carbon black dispersion liquid | 300 parts |
| Photopolymerization initiator (2-benzyl-2-dimethylamino-1-(4-morpholinophenyl)-butanone-1) | - 5 parts |
| Propylene glycol monomethyl ether acetate | 1200 parts |

* Parts are each on a mass basis

The above-mentioned glass substrate having the black matrix layer was introduced to an exposure apparatus including a unit for transporting the substrate from the upstream side to the downstream side, and the substrate was transported to an exposure unit.

The temperature of the body of the exposure apparatus was adjusted to be 23° C.±0.1° C., and relative humidity was adjusted to be 60%±1%.

The glass substrate having the black matrix layer was attached and fixed onto an exposure base, and then automatic adjustment was carried out to adjust the distance (gap) between the coating surface of the glass substrate and a photomask pattern to be 100 μm. The distance from the edge surface of the glass substrate was automatically detected, the position at which the glass substrate was exposed to light was automatically adjusted such that the distance between the glass substrate and the position of the photomask pattern was maintained constant, and then exposure was carried out. A high-pressure mercury lamp was used as a light source, the exposure area was 200 mm×200 mm, and the exposure was carried out with I-line (wavelength: 365 nm) for 20 seconds at an illuminance of 15 mW/cm² and an amount of exposure of 300 mJ/cm².

A development process was carried out with a developing unit provided downstream of the exposure unit. The glass substrate exposed to light was transported at a constant speed of 400 mm/min to yield a black matrix layer-formed substrate (1) in which a black matrix having a predetermined pattern was laminated.

An alignment mark formed of the same material as used for forming the black matrix was analyzed with a dimension measuring apparatus (NEXIV VMR-6555 manufactured by NIKON CORPORATION) at 23° C.±0.1° C. and a relative humidity of 60%±1% to determine the dimensional change in the transport direction and in the direction vertical thereto. The dimension of the pattern actually formed on the glass substrate was 99.998 mm in the transport direction and 100.001 mm in the vertical direction relative to the dimension of the photomask of 100.000 mm in the transport direction and 100.000 mm in the vertical direction.

Then, the substrate was post-baked at 220° C. for 30 minutes in a baking furnace to thermally cure the black matrix. The cured black matrix was analyzed under the above-described conditions (temperature: 23° C.±0.1° C. and relative humidity: 60%±1%), and the dimension of the pattern formed on the substrate (1) was 99.998 mm in the transport direction and 100.001 mm in the vertical direction.

(Formation of RGB Color Layers)
Color pattern-forming compositions containing the following components were applied to the black matrix layer-formed substrate (1) with a die coater so as to have a thickness of 10 μm in a wet state. The product was dried and then pre-baked at 90° C. for 2 minutes to form a black matrix layer-formed substrate (1) to which the color pattern-forming compositions had been applied, the substrate (1) having a thickness of 2 μm.

Components contained in a red color pattern-forming composition are described below, and GREEN and BLUE color pattern-forming compositions can be produced by changing a red pigment to any type of green and blue pigments, respectively. Red, green, and blue pigments individually contain resin compositions in some cases to enhance color development and brightness. Block copolymers with methacrylic acids which have a primary, secondary, or tertiary amino group are used as such resin compositions in many cases; for example, "BYK 6919" manufactured by BYK Japan KK is employed.

(Red Color Pattern-forming Composition)

| | |
|---|---|
| Benzyl methacrylate/methacrylic acid copolymer (molar ratio = 73/27) | 50 parts |
| Trimethylolpropane triacrylate | 40 parts |
| Red pigment (C.I. Pigment Red 254) | 90 parts |
| Photopolymerization initiator (2-methyl-1-[4-(methylthio)phenyl]-2-morpholinopropanon-1) | 1.5 parts |
| Propylene glycol monomethyl ether acetate | 600 parts |

* Parts are each on a mass basis (Green Color Pattern)
A green color pattern was formed as in the formation of the red color pattern except that a green pigment (such as C.I. Pigment Green 58) replaced the red pigment contained in the red color pattern-forming composition.

(Blue Color Pattern)
A blue color pattern was formed as in the formation of the red color pattern except that a blue pigment (such as C.I. Pigment Blue 15.6) replaced the red pigment contained in the red color pattern-forming composition.

The above-mentioned black matrix layer-formed substrate (1) to which the color pattern-forming compositions had been applied was introduced to an exposure apparatus including a unit for transporting the substrate from the upstream side to the downstream side, and the substrate (1) was transported to an exposure unit.

The temperature of the body of the exposure apparatus was adjusted to be 23° C.±0.1° C., and relative humidity was adjusted to be 60%±1%.

The black matrix layer-formed substrate (1) to which the color pattern-forming compositions had been applied was attached and fixed onto an exposure base, and then automatic adjustment was carried out to adjust the distance (gap) between the coating surface of the black matrix layer-formed substrate (1) to which the color pattern-forming compositions had been applied and a photomask pattern to be 100 μm. The distance from the edge surface of the black matrix layer-formed substrate (1) to which the color pattern-forming compositions had been applied was automatically detected, and the position at which the black matrix layer-formed substrate (1) to which the color pattern-forming compositions had been applied was exposed to light was automatically adjusted such that the distance between the black matrix layer-formed substrate (1) to which the color pattern-forming compositions had been applied and the position of the photomask pattern was maintained constant. Then, the substrate (1) was aligned with a RED photomask by using the alignment mark formed at the same time with the formation of the black matrix and subsequently exposed to light. A high-pressure mercury lamp was used as a light source, the exposure area was 200 mm×200 mm, and the exposure was carried out with I-line (wavelength: 365 nm) for 20 seconds at an illuminance of 15 mW/cm$^2$ and an amount of exposure of 100 mJ/cm$^2$.

A development process was carried out with a developing unit provided downstream of the exposure unit. The black matrix layer-formed substrate (1) to which the color pattern-forming compositions had been applied was transported at a constant speed of 400 mm/min after the exposure to light, thereby yielding the substrate (1) in which a RED color layer had been laminated at predetermined positions on the glass substrate corresponding to openings formed in the black matrix. Then, the substrate (1) was post-baked in a baking furnace at 220° C. for 30 minutes to thermally cure the RED color layer.

GREEN and BLUE color layers were formed as in the formation of the RED color layer in sequence, thereby producing a color filter in which the black matrix and the RGB color layers had been formed on the substrate (1). After the post-baking of the BLUE color layer, the black matrix was analyzed under the above-mentioned conditions (temperature: 23° C.±0.1° C. and relative humidity: 60%±1%), and the dimension of the pattern formed on the glass substrate was 99.999 mm in the transport direction and 100.002 mm in the vertical direction.

The dimensional change of the black matrix was 10 ppm in the manufacturing processes from the development of the first layer (black matrix layer) to the post-baking of the fourth layer (BLUE layer); thus, the color filter having a size of 4 inch and a resolution of 200 ppi (width of BM line: 7 μm and pitch: 42 μm) had been able to be formed on the glass substrate without the occurrence of misalignment of pixels.

(Formation of ITO Electrode Layer)

The color filter was subsequently introduced to a sputtering apparatus, and the color filter was subjected to DC sputtering using ITO (indium tin oxide) as a target in the manner of reactive sputtering using oxygen as reactive gas. ITO was deposited on the black matrix and the RGB color layers to a thickness of 150 nm, thereby forming an ITO electrode layer. The value of the sheet resistance of such an ITO electrode was 45 Ω/square.

(Formation of Columnar Spacers)
(Preparation of Dry Film)

In order to form a columnar spacer-forming dry film, a columnar spacer-forming composition containing a negative photosensitive resin was applied onto a PET base film having a thickness of 25 μm with a die coater so as to have a thickness of 20 μm in a wet state. The product was dried and then pre-baked at 90° C. for 2 minutes to have a thickness of 4.5 μm. Then, a PET cover film having a thickness of 25 μm was laminated thereon, thereby yielding the columnar spacer-forming dry film.

(Formation of Multilayer Substrate)

The pattern spacer-forming dry film from which the cover film had been preliminarily removed was placed on the above-described substrate (1), on which the black matrix, the RGB color layers, and the ITO electrode had been formed, such that the columnar spacer-forming composition faced the ITO electrode layer, and a columnar spacer-forming composition layer was sequentially transferred at a roller pressure of 5 kg/cm$^2$, a roller surface temperature of 120° C., and a rate of 800 mm/min. In this process, the base film was not removed, and the product was subsequently subjected to an exposure process in a state in which the base film had been attached to the columnar spacer-forming composition.

(Exposure Process)

The above-mentioned multilayer substrate was introduced to an exposure apparatus including a unit for transporting the substrate from the upstream side to the downstream side, and the multilayer substrate was transported to an exposure unit.

The temperature of the body of the exposure apparatus was adjusted to be 23° C.±0.1° C., and relative humidity was adjusted to be 60%±1%.

The multilayer substrate was attached and fixed onto an exposure base, and then automatic adjustment was carried out to adjust the distance (gap) between the base film of the multilayer substrate and a photomask pattern to be 30 μm. The photomask pattern used in this case served as the pattern for forming spacers on the black matrix.

The distance from the edge surface of the multilayer substrate was automatically detected, and the position at which the multilayer substrate was exposed to light in a pattern was automatically adjusted on the basis of result of the detection such that the distance between the multilayer substrate and the position of the photomask pattern was maintained constant. Then, the multilayer substrate was aligned with a columnar spacer-forming photomask by using the alignment mark formed at the same time with the formation of the black matrix and subsequently exposed to light. A high-pressure mercury lamp was used as a light source, the exposure area was 200 mm×200 mm, and the exposure was carried out with I-line (wavelength: 365 nm) for 20 seconds at an illuminance of 15 mW/cm$^2$ and an amount of exposure of 300 mJ/cm$^2$.

(Development and Post-Baking Processes)

In a development process, the multilayer substrate which had been subjected to the exposure process was transported in a development unit provided downstream of the exposure unit at a constant rate of 400 mm/min while the base film was removed from the multilayer substrate. In this manner, a color filter was yielded in which pattern spacers had been formed at predetermined positions on the grid pattern of the black matrix of the substrate (1) in which the black matrix, the RGB color layers, and the ITO electrode layer had been formed. Then, the product was post-baked in a baking furnace at 220° C. for 30 minutes to thermally cure the columnar spacers. Through these processes, production of a frontplane in which the above-mentioned spacer patterns was used and in which the black matrix, the RGB color layers, the ITO electrode layer, and the columnar spacer was formed so as to overlie the substrate (1) was completed.

(Production of Backplane)
(Formation of TFT Electrode Layers)

A glass substrate used for a liquid crystal display device (OA-10 manufactured by Nippon Electric Glass Co., Ltd.) was prepared as a transparent substrate, and TFT electrode layers were formed on the transparent substrate by the method disclosed in Japanese Unexamined Patent Application Publication No. 2004-140381.

In particular, an amorphous Si layer was formed on the glass substrate so as to have a thickness of 100 nm, and then an oxidized Si layer (SiOx) was formed by vacuum deposition. Then, TFT layers and pixel electrodes were formed so as to overlie the oxidized Si layer by photolithography and an etching method to produce a TFT array-formed glass substrate which served as a backplane.

(Manufacturing of Liquid Crystal Display Device)
(Formation of Alignment Film)

Liquid crystal alignment films were formed on the frontplane and backplanes produced as described above. Both the plates were washed with pure water, and then a liquid crystal alignment agent containing polyimide was applied thereto with a printer used for applying a liquid crystal alignment film (flexographic press). Then, the product was dried in an oven at 180° C. for 20 minutes to form coating films having an average thickness of 600 Å in a dried state on the ITO-formed surface of the frontplane and the TFT electrode layer-formed surface of the backplane. The coating films were rubbed with a rubbing apparatus including a rayon-fabric-wound roller at a roller-rotating rate of 400 rpm, a stage-moving rate of 30 mm/sec, and a hair push-in length of 0.4 mm. Then, the product was washed with water and subsequently dried in an oven at 120° C. for 10 minutes. A sealing material was applied to predetermined part of the frontplane with a dispenser so as to form a closed loop.

An optically and thermally curable resin composition containing a methacrylic acid-modified bisphenol A epoxy resin was used as the sealing material, and a spherical spacer having the size substantially the same as that of the above-mentioned columnar spacer was mixed with the sealing material in an amount of 0.5 mass % relative to the resin component. The amount of the sealing material to be applied was adjusted to enable the sealing width (0.7 mm) of a liquid crystal display device. The liquid crystal composition (LC-21) prepared in Example 20 was dropped to predetermined positions within the closed loop of the sealing material with a dispenser utilizing a constant volume metering pump; in this case, 24.7 pL of the liquid crystal composition was dropped 90 times per frontplane (2223 pL in total).

The frontplane to which the liquid crystal had been dropped and the backplane were attached to an electrostatic chuck. The frontplane and the backplane were disposed so as to face each other, and then the backplane was slowly moved down and then stopped at the distance of 300 μm to the frontplane. In this state, pressure in a vacuum chamber was reduced to 100 Pa. The frontplane and the backplane were aligned with each other for bonding on the basis of an alignment mark which had been preliminarily formed. After the alignment, the backplane was moved further close to the frontplane, and both the plates were held at a distance which enabled the sealing material to contact the TFT electrode layers. Inert gas was introduced into a vacuum chamber in this state to return the inside of the system to atmospheric pressure. The frontplane and the backplane were pressed to each other due to atmospheric pressure, and the height of the columnar spacers defined a cell gap. The sealing material-applied part was subsequently irradiated with ultraviolet light (365 nm and 30 kJ/m$^2$) to cure the sealing material, thereby fixing both the plates to each other. In this state, the plates with the liquid crystal composition confined therebetween were transported to a heating unit and then held for an hour at a surface temperature of 120° C., and the heated product was air-cooled to complete the manufacturing of an active-matrix-driving liquid crystal display device.

REFERENCE SIGNS LIST

100: Substrate a
102: TFT layer
103: Pixel electrode
104: Passivation film
105: Alignment film a
200: Substrate b
201: Planarization film (overcoat layer)
202: Black matrix
203: Color filter
204: Transparent electrode
205: Alignment film b
301: Sealing material
302: Columnar spacer
303: Liquid crystal layer
304: Protrusion
401: Columnar spacer-patterning photomask
402: Columnar spacer-forming composition

The invention claimed is:

1. A liquid crystal composition having a positive dielectric anisotropy comprising a dielectrically positive component (A) and a dielectrically neutral component (B), wherein the dielectrically positive component (A) comprises:

a dielectrically positive compound represented by Formula (1)

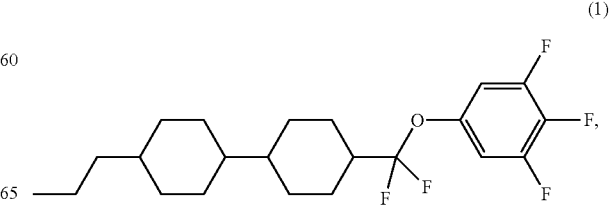

a dielectrically positive compound represented by Formula (6.1)

(6.1)
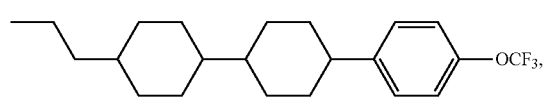

and
a compound represented by Formula (13.3)

(13.3)
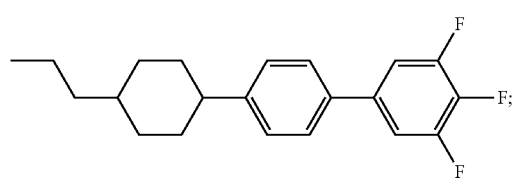

and
wherein the dielectrically neutral component (B) has a dielectric anisotropy larger than −2 and smaller than +2 and comprises:
a compound represented by Formula (2.1)

(2.1)
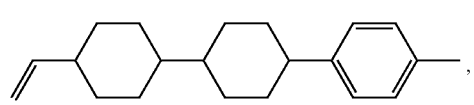

and
a compound represented by Formula (5.4)

(5.4)
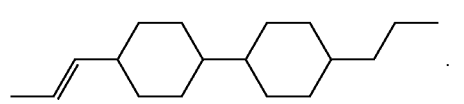

2. The liquid crystal composition according to claim 1, wherein the dielectrically positive component (A) further comprises at least one compound selected from the group consisting of compounds represented by Formulae (6.3), (6.4), (11.7), (14.1), (14.2), and (18.3)

(6.3)
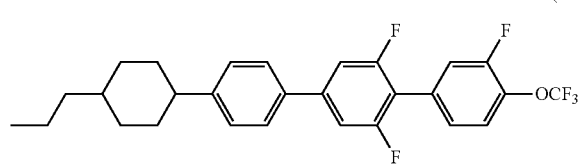

(6.4)
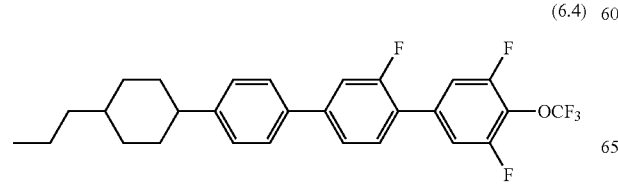

(11.7)
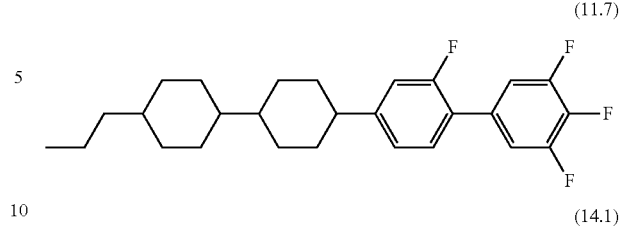

(14.1)
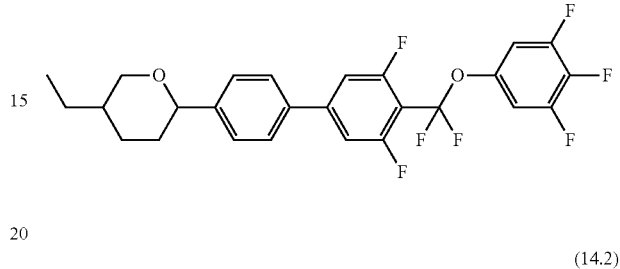

(14.2)

(18.3)

3. The liquid crystal composition according to claim 1, wherein the dielectrically neutral component (B) further comprises at least one compound selected from the group consisting of compounds represented by Formulae (3.1), (3.2), and (3.4)

(3.1)
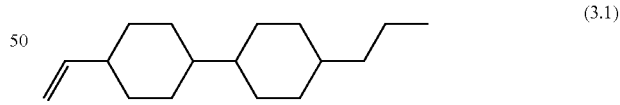

(3.2)
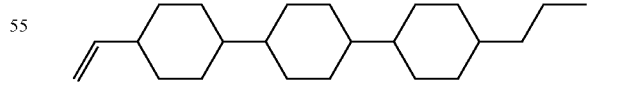

(3.4)
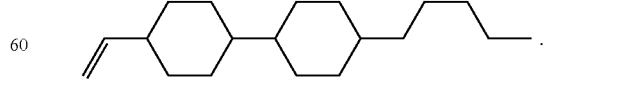

4. The liquid crystal composition according claim 1, wherein the dielectrically positive component (A) further comprises at least one of compounds represented by Formulae (4.1) and (4.2)

(4.1)

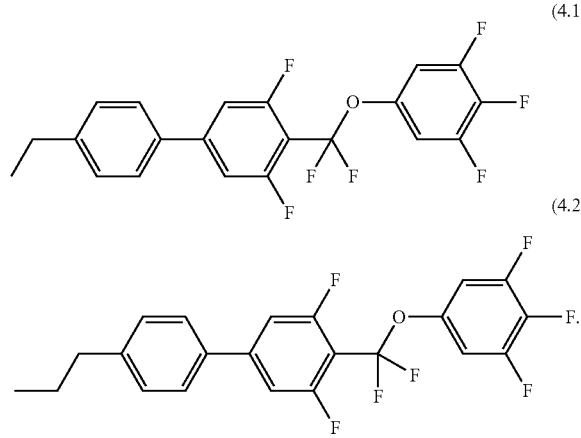

(4.2)

5. The liquid crystal composition according to claim 1, wherein the dielectrically neutral component (B) further comprises at least one compound selected from the group consisting of compounds represented by Formulae (5.1) to (5.3)

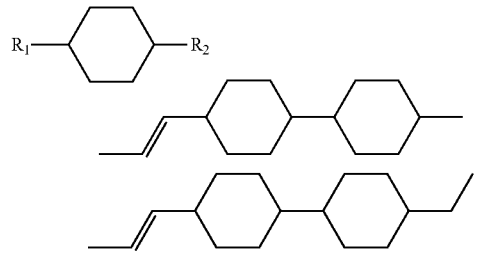

(5.1)
(5.2)
(5.3)

where $R_1$ and $R_2$ each independently represent a linear alkyl group or linear alkenyl group having 1 to 10 carbon atoms.

6. The liquid crystal composition according to claim 1, wherein the dielectrically positive component (A) further comprises at least one of compounds represented by Formula (6.2)

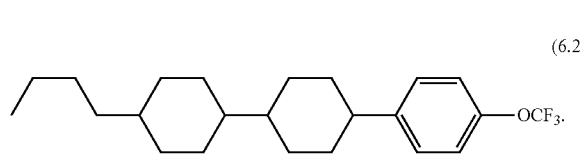

(6.2)

7. The liquid crystal composition according to claim 1, wherein the dielectrically positive component (A) further comprises at least one compound selected from the group consisting of compounds represented by Formulae (7.1) to (7.3)

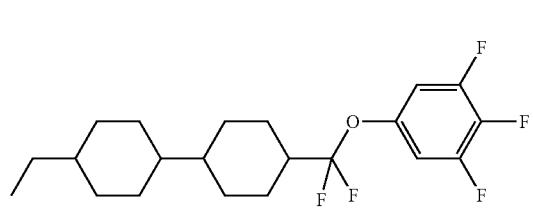

(7.1)

-continued

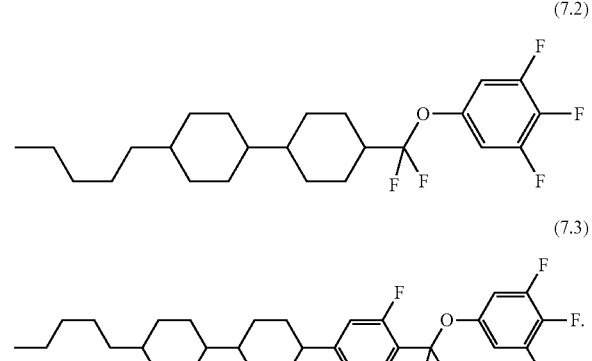

(7.2)
(7.3)

8. The liquid crystal composition according to claim 1, wherein the dielectrically neutral component (B) further comprises at least one compound selected from the group consisting of compounds represented by Formulae (8.1) and (8.2)

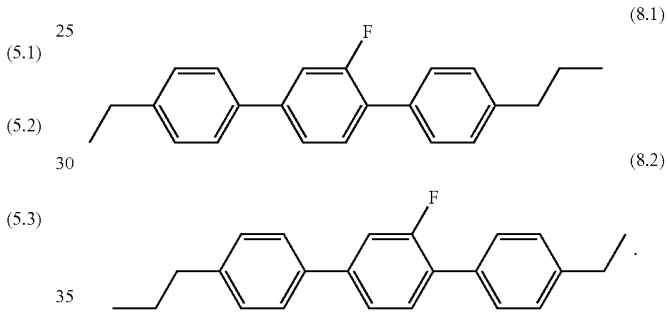

(8.1)
(8.2)

9. The liquid crystal composition according to claim 1, wherein the dielectrically neutral component (B) further comprises at least one compound selected from the group consisting of compounds represented by Formulae (9.1) to (9.5)

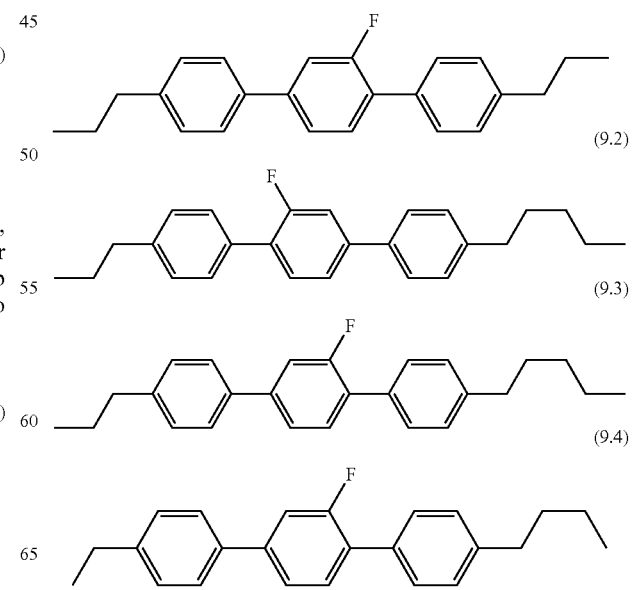

(9.1)
(9.2)
(9.3)
(9.4)

-continued (9.5)
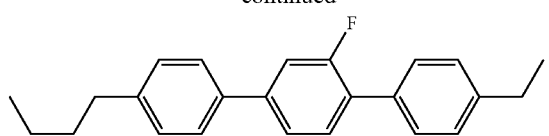

10. The liquid crystal composition according claim 1, wherein the dielectrically neutral component (B) further comprises at least one compound selected from the group consisting of compounds represented by Formulae (10.1) and (10.2), (10.1)
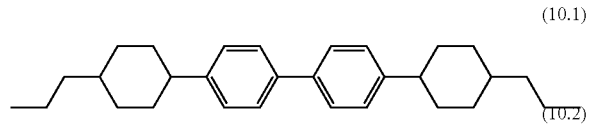

(10.2)
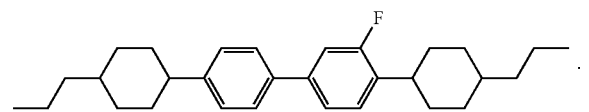

11. The liquid crystal composition according to claim 1, wherein the dielectrically positive component (A) further comprises at least one compound selected from the group consisting of compounds represented by Formulae (11.1) to (11.3), (11.5), and (11.6)

(11.1)
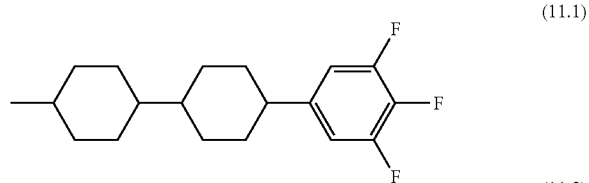

(11.2)
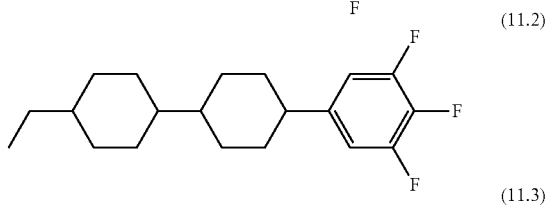

(11.3)
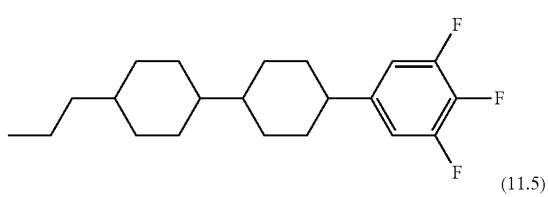

(11.5)
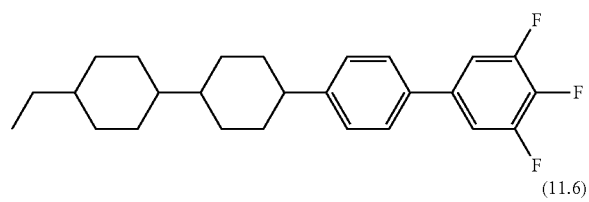

(11.6)
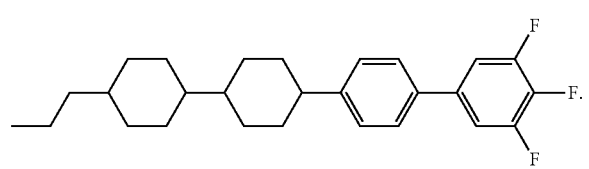

12. The liquid crystal composition according claim 1, wherein the dielectrically neutral component (B) further comprises a compound represented by Formula (12.1) or (12.2)

(12.1)

(12.2)
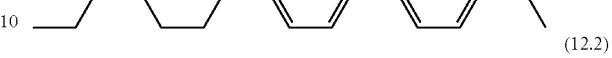

13. The liquid crystal composition according to claim 1, wherein the dielectrically positive component (A) further comprises at least one compound selected from the group consisting of compounds represented by Formulae (13.1), (13.2), and (13.4)

(13.1)
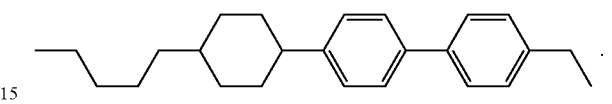

(13.2)
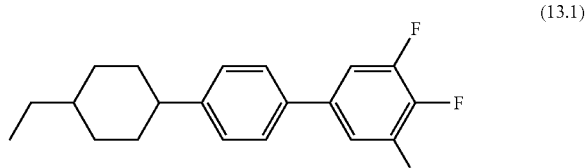

(13.4)
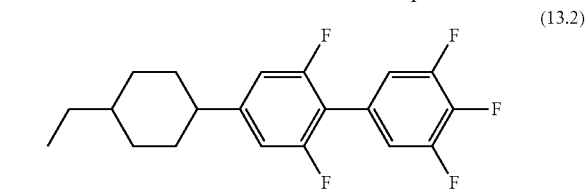

14. The liquid crystal composition according to claim 1, wherein the dielectrically positive component (A) further comprises at least one compound selected from the group consisting of compounds represented by Formulae (15.1) to (15.3)

(15.1)
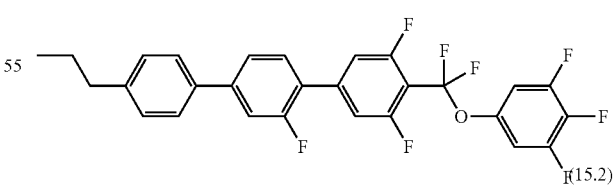

(15.2)
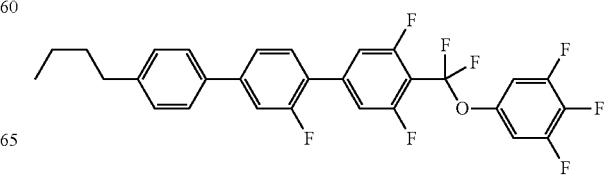

(15.3)

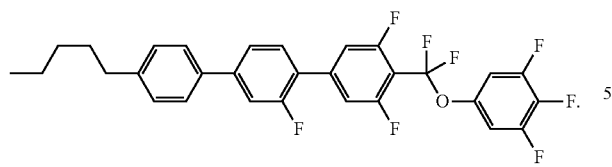

15. The liquid crystal composition according to claim 1, wherein the dielectrically neutral component (B) further comprises at least one compound selected from the group consisting of compounds represented by Formulae (16.1) to (16.3)

(16.1)

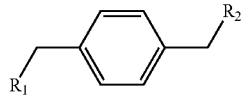

(16.2)

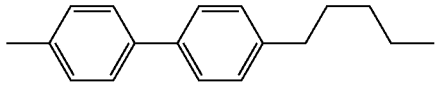

(16.3)

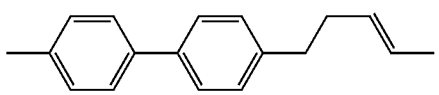

where $R_1$ and $R_2$ each independently represent a linear alkyl group or linear alkenyl group having 1 to 10 carbon atoms.

16. The liquid crystal composition according to claim 1, wherein the dielectrically neutral component (B) further comprises at least one of compounds represented by Formulae (17.1) and (17.2)

(17.1)

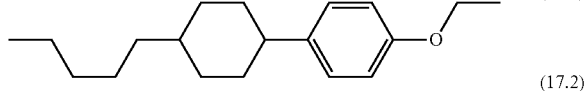

(17.2)

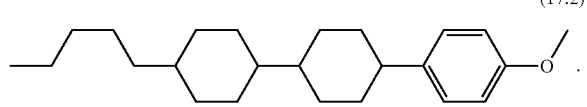

17. The liquid crystal composition according claim 1, wherein the dielectrically positive component (A) further comprises at least one compound selected from the group consisting of compounds represented by Formulae (18.1), (18.2), (18.4), and (18.5)

(18.1)

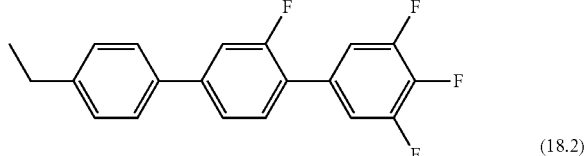

(18.2)

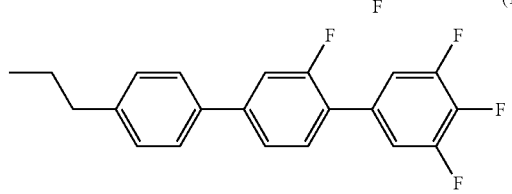

(18.4)

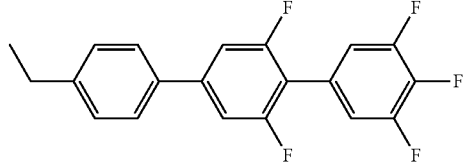

(18.5)

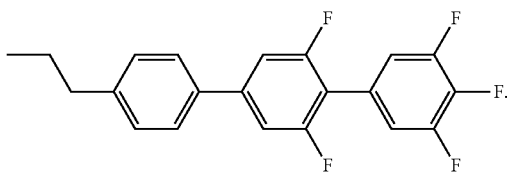

18. The liquid crystal composition according to claim 1, wherein the dielectrically positive component (A) further comprises at least one compound selected from the group consisting of compounds represented by Formulae (19.1) to (19.5)

(19.1)

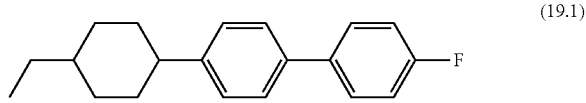

(19.2)

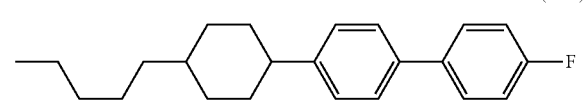

(19.3)

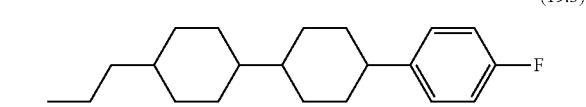

(19.4)

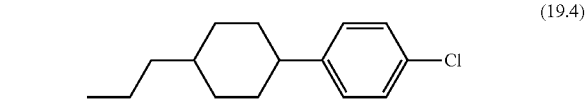

(19.5)

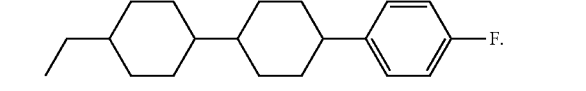

19. The liquid crystal composition according to claim 1, wherein the dielectrically positive component (A) further comprises at least one compound selected from the group consisting of compounds represented by Formulae (20.1) to (20.3)

(20.1)

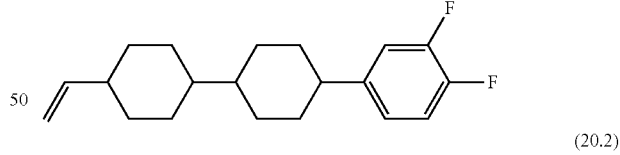

(20.2)

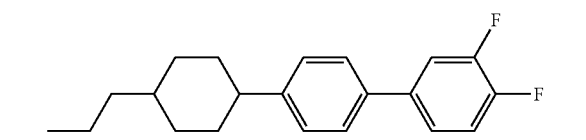

(20.3)

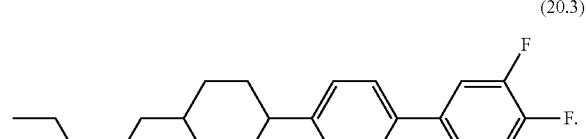

20. The liquid crystal composition according to claim 1, wherein the dielectrically neutral component (B) further comprises at least one compound selected from the group consisting of compounds represented by Formulae (21.1) to (21.3)
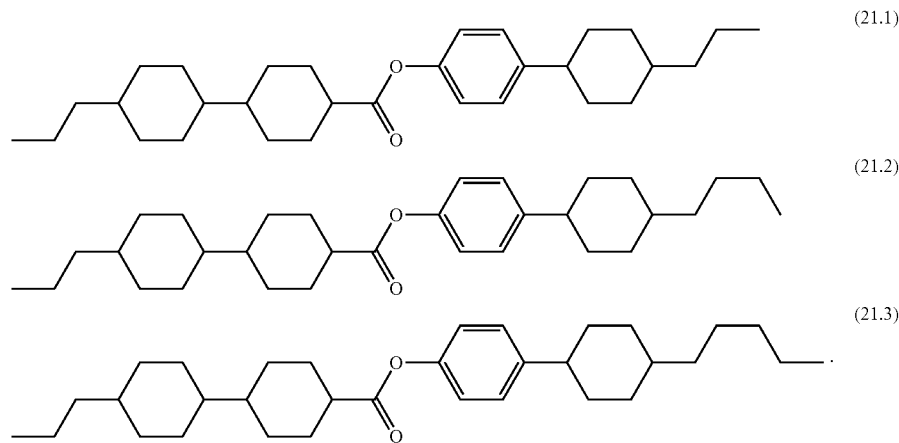
21. An active-matrix-driving liquid crystal display device comprising the liquid crystal composition according to claim 1.
* * * * *